United States Patent
Sanli et al.

(10) Patent No.: US 8,000,996 B1
(45) Date of Patent: Aug. 16, 2011

(54) SYSTEM AND METHOD FOR MARKDOWN OPTIMIZATION

(75) Inventors: Tugrul Sanli, Cary, NC (US); Xiaodong Yao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 762 days.

(21) Appl. No.: 11/937,103

(22) Filed: Nov. 8, 2007

Related U.S. Application Data

(60) Provisional application No. 60/922,772, filed on Apr. 10, 2007.

(51) Int. Cl.
*G06Q 10/00* (2006.01)

(52) U.S. Cl. .................................................... 705/7.35

(58) Field of Classification Search .............. 705/7, 7.35
See application file for complete search history.

(56) References Cited

U.S. PATENT DOCUMENTS

| | | | |
|---|---|---|---|
| 5,195,172 A | 3/1993 | Elad et al. |
| 5,319,781 A | 6/1994 | Syswerda |
| 5,627,973 A | 5/1997 | Armstrong et al. |
| 5,652,842 A | 7/1997 | Siegrist, Jr. et al. |
| 5,712,989 A | 1/1998 | Johnson et al. |
| 5,767,854 A | 6/1998 | Anwar |
| 5,799,286 A | 8/1998 | Morgan et al. |
| 5,926,820 A | 7/1999 | Agrawal et al. |
| 5,946,662 A | 8/1999 | Ettl et al. |
| 5,953,707 A | 9/1999 | Huang et al. |
| 5,963,910 A | 10/1999 | Ulwick |
| 5,999,908 A | 12/1999 | Abelow |
| 6,009,407 A | 12/1999 | Garg |
| 6,014,640 A | 1/2000 | Bent |
| 6,023,684 A | 2/2000 | Pearson |
| 6,029,139 A | 2/2000 | Cunningham et al. |
| 6,041,267 A | 3/2000 | Dangat et al. |
| 6,078,892 A | 6/2000 | Anderson et al. |
| 6,115,691 A | 9/2000 | Ulwick |
| 6,151,582 A | 11/2000 | Huang et al. |
| 6,175,876 B1 | 1/2001 | Branson et al. |
| 6,182,060 B1 | 1/2001 | Hedgcock et al. |
| 6,226,623 B1 | 5/2001 | Schein et al. |

(Continued)

FOREIGN PATENT DOCUMENTS

EP 1413955 4/2004

(Continued)

OTHER PUBLICATIONS

International Search Report, issued Jun. 22, 2004, for International Application PCT/US03/13394.

(Continued)

*Primary Examiner* — James Kramer
*Assistant Examiner* — Eric T Wong
(74) *Attorney, Agent, or Firm* — Jones Day

(57) ABSTRACT

Computer-implemented systems and methods for identifying markdown prices for items. As an example, a system and method can include identifying for each item an optimal markdown plan containing a markdown price for the item. Also, the method and system can be configured to identify for each item an optimal delay plan. For each item, a delay cost and a markdown spend are calculated, and a comparison is performed of the item's delay cost with respect to the item's markdown spend. The comparison is used to determine whether to mark down an item based upon the item's determined markdown price.

13 Claims, 15 Drawing Sheets

U.S. PATENT DOCUMENTS

| | | | |
|---|---|---|---|
| 6,236,977 B1 | 5/2001 | Verba et al. | |
| 6,237,138 B1 | 5/2001 | Hameluck et al. | |
| 6,249,768 B1 | 6/2001 | Tulskie et al. | |
| 6,263,315 B1 | 7/2001 | Talluri | |
| 6,275,812 B1 | 8/2001 | Haq et al. | |
| 6,286,005 B1 | 9/2001 | Cannon | |
| 6,321,133 B1 | 11/2001 | Smirnov et al. | |
| 6,321,206 B1 | 11/2001 | Honarvar | |
| 6,397,224 B1 | 5/2002 | Zubeldia et al. | |
| 6,456,999 B1 | 9/2002 | Netz | |
| 6,470,344 B1 | 10/2002 | Kothuri et al. | |
| 6,484,179 B1 | 11/2002 | Roccaforte | |
| 6,502,077 B1 | 12/2002 | Speicher | |
| 6,526,526 B1 | 2/2003 | Dong et al. | |
| 6,546,135 B1 | 4/2003 | Lin et al. | |
| 6,553,352 B2 | 4/2003 | Delurgio et al. | |
| 6,560,501 B1 | 5/2003 | Walser et al. | |
| 6,581,068 B1 | 6/2003 | Bensoussan et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,728,724 B1 | 4/2004 | Megiddo et al. | |
| 6,735,570 B1 | 5/2004 | Lacy et al. | |
| 6,750,864 B1 | 6/2004 | Anwar | |
| 6,898,603 B1 | 5/2005 | Petculescu et al. | |
| 6,901,406 B2 | 5/2005 | Nabe et al. | |
| 6,907,382 B2 | 6/2005 | Urokohara | |
| 6,970,830 B1 | 11/2005 | Samra et al. | |
| 7,039,594 B1 | 5/2006 | Gersting | |
| 7,085,734 B2 | 8/2006 | Grant et al. | |
| 7,089,266 B2 | 8/2006 | Stolte et al. | |
| 7,092,896 B2 | 8/2006 | Delurgio et al. | |
| 7,092,929 B1* | 8/2006 | Dvorak et al. | 705/28 |
| 7,130,811 B1 | 10/2006 | Delurgio et al. | |
| 7,133,876 B2 | 11/2006 | Roussopoulos et al. | |
| 7,133,882 B1 | 11/2006 | Pringle et al. | |
| 7,171,376 B2 | 1/2007 | Ramakrishnan | |
| 7,236,949 B2 | 6/2007 | Natan et al. | |
| 7,240,019 B2 | 7/2007 | Delurgio et al. | |
| 7,249,031 B2 | 7/2007 | Close et al. | |
| 7,251,615 B2 | 7/2007 | Woo | |
| 7,302,400 B2 | 11/2007 | Greenstein | |
| 7,302,410 B1 | 11/2007 | Venkatraman et al. | |
| 7,346,538 B2 | 3/2008 | Reardon | |
| 7,370,366 B2 | 5/2008 | Lacan et al. | |
| 7,379,890 B2 | 5/2008 | Myr et al. | |
| 7,440,903 B2 | 10/2008 | Riley et al. | |
| 7,536,361 B2 | 5/2009 | Alberti et al. | |
| 7,617,119 B1 | 11/2009 | Neal et al. | |
| 7,689,456 B2 | 3/2010 | Schoeder et al. | |
| 7,752,067 B2 | 7/2010 | Fotteler et al. | |
| 2002/0013757 A1 | 1/2002 | Bykowsky et al. | |
| 2002/0046096 A1 | 4/2002 | Srinivasan et al. | |
| 2002/0072953 A1 | 6/2002 | Michlowitz et al. | |
| 2002/0099678 A1 | 7/2002 | Albright et al. | |
| 2002/0107723 A1 | 8/2002 | Benjamin et al. | |
| 2002/0116237 A1 | 8/2002 | Cohen et al. | |
| 2002/0123930 A1 | 9/2002 | Boyd et al. | |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2003/0023598 A1 | 1/2003 | Janakiraman et al. | |
| 2003/0028437 A1* | 2/2003 | Grant et al. | 705/26 |
| 2003/0050845 A1 | 3/2003 | Hoffman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0126010 A1 | 7/2003 | Barns-Slavin | |
| 2003/0126136 A1 | 7/2003 | Omoigui | |
| 2003/0167098 A1 | 9/2003 | Walser et al. | |
| 2003/0172145 A1 | 9/2003 | Nguyen | |
| 2003/0208402 A1 | 11/2003 | Bibelnieks et al. | |
| 2003/0208420 A1 | 11/2003 | Kansal | |
| 2003/0220830 A1 | 11/2003 | Myr | |
| 2003/0229502 A1* | 12/2003 | Woo | 705/1 |
| 2003/0236721 A1 | 12/2003 | Plumer et al. | |
| 2004/0093296 A1 | 5/2004 | Phelan et al. | |
| 2004/0111388 A1 | 6/2004 | Boiscuvier et al. | |
| 2004/0199781 A1 | 10/2004 | Erickson et al. | |
| 2005/0033761 A1 | 2/2005 | Guttman et al. | |
| 2005/0066277 A1 | 3/2005 | Leah et al. | |
| 2005/0096963 A1 | 5/2005 | Myr et al. | |
| 2005/0197896 A1 | 9/2005 | Viet et al. | |
| 2005/0198121 A1 | 9/2005 | Daniels et al. | |
| 2005/0256726 A1 | 11/2005 | Benson et al. | |
| 2005/0256753 A1 | 11/2005 | Viet et al. | |
| 2005/0262108 A1 | 11/2005 | Gupta | |
| 2006/0047608 A1 | 3/2006 | Davis et al. | |
| 2006/0069598 A1 | 3/2006 | Schweitzer et al. | |
| 2006/0074728 A1 | 4/2006 | Schweitzer et al. | |
| 2006/0143030 A1 | 6/2006 | Wertheimer | |
| 2006/0248010 A1 | 11/2006 | Krishnamoorthy et al. | |
| 2007/0055482 A1 | 3/2007 | Goodermote et al. | |
| 2007/0174119 A1 | 7/2007 | Ramsey et al. | |
| 2007/0288296 A1 | 12/2007 | Lewis | |
| 2008/0077459 A1 | 3/2008 | Desai et al. | |
| 2008/0208719 A1 | 8/2008 | Sharma et al. | |
| 2009/0271241 A1 | 10/2009 | Pratt | |

FOREIGN PATENT DOCUMENTS

| | | |
|---|---|---|
| WO | WO 01/11522 | 2/2001 |
| WO | 2007/002841 | 1/2007 |

OTHER PUBLICATIONS

De Prisco et al., "On Optimal Binary Search Trees", Information Processing Letters, vol. 45, pp. 249-253 (Apr. 1993).

Pedersen et al., "Multidimensional Database Technology", IEEE, Computer, vol. 34, Issue 12, pp. 40-46 (Dec. 2001).

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

Model1 by Group 1 Software, www.g1.com, Aug. 29, 1999, pp. 1-16, retrieved from Google.com and archive.org.

SAS Institute, Inc., www.sas.com, Jan. 29, 1998, pp. 1-28, retrieved from Google.com and archive.org.

Hollander, Geoffrey, "Modell deftly parses customer characteristics", InfoWorld, May 25, 1998, vol. 20, No. 21, pp. 1-4, retrieved from Dialog, file 148.

"Unica Releases Model 1 Enterprise Edition", Business Wire, Oct. 29, 1998, pp. 1-3, retrieved from Proquest Direct.

Rosen, Michele, "There's Gold in That There Data", Insurance & Technology, Dec. 1998, vol. 23, No. 12, pp. 1-6, , retrieved from Dialog, file 16.

Saarenvirta, Data Mining to Improve Profitability, CMA Magazine, vol. 72, No. 2, Mar. 1998, pp. 8-12.

Johnson et al, Recent Developments and Future Directions in Mathematical Programming, IBM Systems Journal, vol. 31, No. 1, 1992, p. 79-93.

Balintfy et al, Binary and Chain Comparisons with an Experimental Linear Programming Food Price Index, The Review of Economics and Statistics, vol. 52, No. 3, Aug. 1970, pp. 324-330.

Manchanda et al, The "Shopping Basket"; A Model for Multi-Category Purchase Incidence Decisions, Marketing Science, vol. 18, No. 2, 1999, pp. 95-114.

Data Mining News, Looking Past Automation, MarketSwitch Focuses on Optimization of Marketing Campaigns, Data Mining News, May 10, 1999.

Porter-Kuchay, Multidimensional Marketing, Target Marketing, Jan. 2000.

Spiegelman, Optimizers Assist in Specialized marketing Efforts, Computer Reseller News, Nov. 22, 1999.

Horngren, Charles T. et al., "Cost Accounting a Managerial Emphasis", Tenth Edition, Chapter 14, pp. 497-534, 2000.

"Advances in Mathematical Programming and Optimization in the SAS System" by Kearney, SAS Institute, SUGI Proceedings, 1999.

"SAS/OR Optimization Procedures, with Applications to the Oil Industry" by Cohen et al, SAS Institute, SUGI Proceedings, 1994.

"Supply chain design and analysis: models and methods" by Beamon, International Journal of Production Economics, 1998.

"An effective supplier development methodology for enhancing supply chain performance" by Lee et al, ICMIT, 2000.

"Perfect and Open Ratings Form Alliance to Provide Critical Supplier Performance Ratings to Private Exchanges and Net Markets", Business Wire, Oct. 30, 2000.

"i2 Technologies: i2 releases i2 five.two-the complete platform for dynamic value chain management; flexible, intuitive, powerful solutions designed to help companies gain efficiencies and drive revenue", M2 Presswire, Oct. 25, 2001.

"Simulation Optimization Using Soft Computing" by Andres Medaglia, PhD dissertation for Operations Research Department at North Carolina State University, Jan. 24, 2001.

"Supplier Selection and Management system Considering Relationships in Supply Chain Management" by Lee et al, IEEE Transactions on Engineering Management, Aug. 2001.

"Solver setting for optimal solutions" by Ananda Samudhram, New Straits Times, Nov. 22, 1999.

"Evaluating Suppliers of Complex Systems: A multiple criteria approach" by Cook et al, The Journal of the Operational Research Society, Nov. 1992.

Armstrong, Mark, "Multiproduct Nonlinear Pricing", Econometrica, vol. 64, No. 1, pp. 51-75 (Jan. 1996).

Armstrong, Ronald D. et al., The Multiple-Choice Nested Knapsack Model, Management Science, vol. 28, No. 1, pp. 34-43 (Jan. 1982).

Chettri, Inderlal Singh et al., "Pre Pack Optimization: Increasing Supply Chain Efficiency", Cognizant Technology Solutions, pp. 1-26 (undated).

Kelley, Dave, "Merchandise Intelligence: Predictive insights improve bottom line," RIS News, p. 32 (Mar. 2006).

Pisinger, David, "A Minimal Algorithm for the Multiple-Choise Knapsack Problem", Technical Report 94/25, DIKU, University of Copenhagen, Denmark, pp. 1-23 (May 1984).

Ramirez, Ariel Ortiz, "Three-Tier Architecture," Linux Journal, downloaded from http://www.linuxjournal.com/article/3508, 4 pp. (Jul. 1, 2000).

Renaud, Jacques et al., "A heuristic for the pickup and delivery traveling salesman problem," Computers & Operations Research, 27, pp. 905-916 (2000).

Schindler et al., "Increased Consumer Sales Response Through Use of 99-ending Prices" Journal of Retailing, vol. 72, pp. 187-199 (1996).

Cognizant Technology Solutions, "Pre Pack Optimization: Increasing Supply Chain Efficiency", pp. 1-26 (undated).

"i2 Technologies: i2 releases i2 five.two-the complete platform for dynamic value chain management; flexible, intuitive, powerful solutions designed to help companies gain efficiencies and drive revenue", M2 Presswire (Oct. 25, 2001).

i2 Technologies, Inc., "Improving Service and Market Share with i2 Inventory Optimization: How superior inventory management can be deployed as a competitive weapon to drive the top and the bottom line", pp. 1-26 (Aug. 2004).

Microsoft, MSDN, Chapter 5: Layered Application Guidelines, downloaded from http://msdn.microsoft.com/en-us/library/ee658109(d=printer).aspx (10 pp.).

Microsoft, MSDN, Three-Layered Services Application, downloaded from http://msdn.microsoft.com/en-us/library/ff648105(d=printer).aspx (6 pp.).

Multitier Architecture definition from Wikipedia (4 pp.).

* cited by examiner

```
Step 1. k=0;
        budget = B;
        while(k<N and budget > 0)
        begin;
            k = k + 1;                      /*Advance to the next product/location pair*/
            budget=budget - b_jk;           /*Consume budget*/
            x_jk = 1;                       /*Markdown for product/location pair_jk is approved*/
        end;
        /*Check if B is exceeded*/
        if(budget < 0) then
        begin;
            x_jk = 1 + budget/b_jk;         /*Partial markdown for product/location pair_jk is approved*/
        end;
```

|  | Product A | | Product B | | Product C | |
|---|---|---|---|---|---|---|
|  | Optimal Plan | Delay Plan | Optimal Plan | Delay Plan | Optimal Plan | Delay Plan |
| Regular Price | 89.99 | 89.99 | 49.99 | 49.99 | 39.99 | 39.99 |
| Current Price | 89.99 | 89.99 | 49.99 | 49.99 | 39.99 | 39.99 |
| Current Inventory | 210 | | 325 | | 270 | |
| End Inventory Target | 15 | | 20 | | 20 | |
| W1 | 25% | 0% | 25% | 0% | 25% | 0% |
| W2 | 25% | 25% | 25% | 25% | 25% | 25% |
| W3 | 25% | 25% | 25% | 25% | 25% | 25% |
| W4 | 25% | 50% | 25% | 50% | 25% | 50% |
| W5 | 50% | 50% | 50% | 50% | 50% | 50% |
| W6 | 50% | 50% | 50% | 50% | 50% | 50% |
| W7 | 50% | 50% | 50% | 50% | 50% | 50% |
| W8 | 50% | 50% | 50% | 50% | 50% | 50% |
| End Inventory | 8 | 25 | 18 | 40 | 21 | 45 |
| Total Revenue | $11,270.35 | $10,488.33 | $9,515.10 | $8,975.70 | $6,173.66 | $5,668.58 |
| Delay Cost (DC$) | $782.01 | | $539.39 | | $505.07 | |
| Markdown Spend (MS$) in WI | $4,724.48 | | $4,061.69 | | $2,699.33 | |
| DC$/MS$ | 0.17 | | 0.13 | | 0.19 | |
| IVR without pooling | 0 | 10 | 0 | 20 | 1 | 25 |
| IVR with pooling | 0.00 | 12.50 | 0.00 | 20.00 | 0.00 | 22.50 |

Fig. 7

☐ Create Plan

Plan Detail
Group Name: Server Clearance
Products: 17
Locations: 19
Product-locations: 138

Choose a Markdown Plan type and goals
| | |
|---|---|
| Plan Type: | Optimized Plan |
| Primary Goal: | Minimize Inventory at Risk |
| Secondary Goal: | Maximize Revenue and Margin |
| Target Inventory at end date: | 30 % |

Set plan details
| | |
|---|---|
| Start date: | 06/13/2005 |
| End date: | 06/27/2005 |
| Allowed markdown dates: | ○ All dates ⦿ Select dates |
| Unit salvage value for end date: | 20.00 % |
| Uniform price or discount schedule: | Not activated |
| Force at least one markdown: | Not activated |

Select next step
⦿ Save and run optimization: Now
  ☑ Make optimized solution the Active Plan
    ☐ Pre-approve first markdown for plan
    ☐ Automatically optimize plan with new data
○ Open Markdown Plan Details page

[OK] [Cancel] [Help]

Plan Rules

Plan Detail

Group Name: adhesives   Products: 9   Locations: 223

| Price Rules | Price Points | Percentage Discount | Percentage Off with Price Endings |

Maximum number of markdowns  [ 3 ]

Minimum number of periods between clearance markdowns  [ 1 ]

Maximum overall discount  [ 90.00 ] %

Maximum single discount  [ 90.00 ] %

Minimum discount for initial clearance markdowns  [ 20.00 ] %

Minimum single discount  [ 10.00 ] %

[ Apply ]  [ Cancel ]  [ Help ]

*Fig. 10*

| Price Schedule | 04/25/2005 | 05/02/2005 | 05/09/2005 | 05/16/2005 | 05/23/2005 | 05/30/2005 | 06/06/2005 |
|---|---|---|---|---|---|---|---|
| Price ($): Last Regular | 19.83 | 19.83 | 19.83 | 19.83 | 19.83 | 19.83 | 19.83 |
| Price ($): Plan | 15.80-19.83 | 15.80 | 15.80 | 15.80 | 15.80 | 15.80 | 15.80 |
| Price (%off): Plan | 0.000-20.323 | 20.323 | 20.323 | 20.323 | 20.323 | 20.323 | 20.323 |
| Markdown Cost ($): Plan Est. | | | | | | | |
| Markdown Cost ($): Actual | | | | | | | |
| Markdown Cost ($): Baseline Est. | | | | | | | |
| Revenue ($): Plan Est. | | | | | | | |

Price Schedule Additional Data
☑ Show Actual Data  ☑ Show Baseline Data

Price Changes in this Plan
Allowed: 3  Taken: 0  Planned: 0-1

Uniform Price Schedule
☐ Force same price or discount schedule for all products at all locations

Price Schedule — 550

| Status | 05/16/2005 | 05/23/2005 | 05/30/2005 | 06/06/2005 | 06/13/2005 | 06/20/2005 | 06/27/2005 | 07/04/2005 |
|---|---|---|---|---|---|---|---|---|
|  |  |  |  |  |  |  | Tentative | Draft |
| Price ($): Last Regular | 49.97 | 49.97 | 49.97 | 49.97 | 49.97 | 49.97 | 49.97 | 49.97 |
| Price ($): Current | 49.97 | 49.97 | 49.97 | 49.97 | 49.97 | 49.97 | ☐ 49.97 | ☐ 49.97 |
| Price ($): Plan | 49.97 | 49.97 | 49.97 | 49.97 | 49.97 | 49.97 | ☑ 19.98 | ☐ 9.99 |
| Price (%off): Plan | 0.000 | 0.000 | 0.000 | 0.000 | 0.000 | 0.000 | 60.000 | 80.000 |
| Markdown Cost ($): Plan Est. | 0.00 | 0.00 | 0.00 | 0.00 | 0.00 | 0.00 | 629.62 | 139.91 |
| Markdown Cost ($): Baseline Est. | 0.00 | 0.00 | 0.00 | 0.00 | 0.00 | 0.00 | 0.00 | 0.00 |
| Revenue ($): Plan Est. | 1,249.25 | 1,249.25 | 949.43 | 549.67 | 549.67 | 249.85 | 139.91 | 99.94 |

Price Schedule Additional Data
☐ Show Actual Data  ☑ Show Baseline Data

Price Changes in this Plan
Allowed: 3   Taken: 0   Planned: 2

Uniform Price Schedule
☐ Force same price or discount schedule for all products at all locations

*Fig. 14*

SYSTEM AND METHOD FOR MARKDOWN OPTIMIZATION

CROSS-REFERENCE TO RELATED APPLICATION

This application claims priority to and the benefit of U.S. Application Ser. No. 60/922,772 (entitled Markdown Optimization Systems And Methods and filed on Apr. 10, 2007), of which the entire disclosure (including any and all figures) is incorporated herein by reference.

TECHNICAL FIELD

The technology described in this patent document relates generally to a markdown optimization, and more specifically to computer-implemented systems and methods for optimizing a clearance plan for an item or items for sale.

BACKGROUND

One of the largest business problems that retailers face is how to liquidate inventory during the clearance period while maximizing profit yet still following certain business rules and limitations. In retail practice this problem is referred to as markdown optimization. The goal of markdown optimization is to determine which products to mark down, how much to mark them down, when to mark them down, and in which markets or stores. These recommendations can be based on factors such as inventory levels, base sales volume, price elasticity, local preferences, and local demand. Such a series of price decreases devised for a particular item or set of items are typically called a price schedule and are used by retailers to guide them in decreasing or eliminating inventory during the clearance period.

SUMMARY

In accordance with the teachings herein, computer-implemented systems and methods are provided for markdown optimization. For example, a system and method can be configured to identify for an item an optimal markdown plan containing a markdown price for the item. Also, the method and system can be configured to identify for an item an optimal delay plan. For an item, a delay cost and a markdown spend are calculated, and a comparison is performed of the item's delay cost with respect to the item's markdown spend. The comparison is used to determine whether to mark down an item based upon the item's determined markdown price.

As another example, a system and method can be configured to identify markdown prices for items offered by a first entity. This includes identifying for each item an optimal markdown plan containing a markdown price for the item, with the optimal markdown plan being optimal with respect to one or more user-specified objectives. Also, for each item an optimal delay plan is identified, with the optimal delay plan being optimal with respect to the user-specified objectives and also satisfy an additional constraint of delaying a first markdown until a subsequent budget period. For each item, a delay cost and a markdown spend are calculated, and a comparison of the item's delay cost is performed with respect to the item's markdown spend. The comparison is to be used by a second entity to determine whether to mark down an item based upon the item's determined markdown price.

BRIEF DESCRIPTION OF THE DRAWINGS

FIG. 6 is a pseudocode listing of an example method for selecting product/location pairs for inclusion in a markdown plan while conforming to a budget constraint.

FIG. 7 is an example graphical user interface displaying details of a markdown plan generated by the markdown optimization system.

FIGS. 8-14 are example graphical interfaces displaying various aspects of operation of an example markdown optimization system.

DETAILED DESCRIPTION

Figure 1:
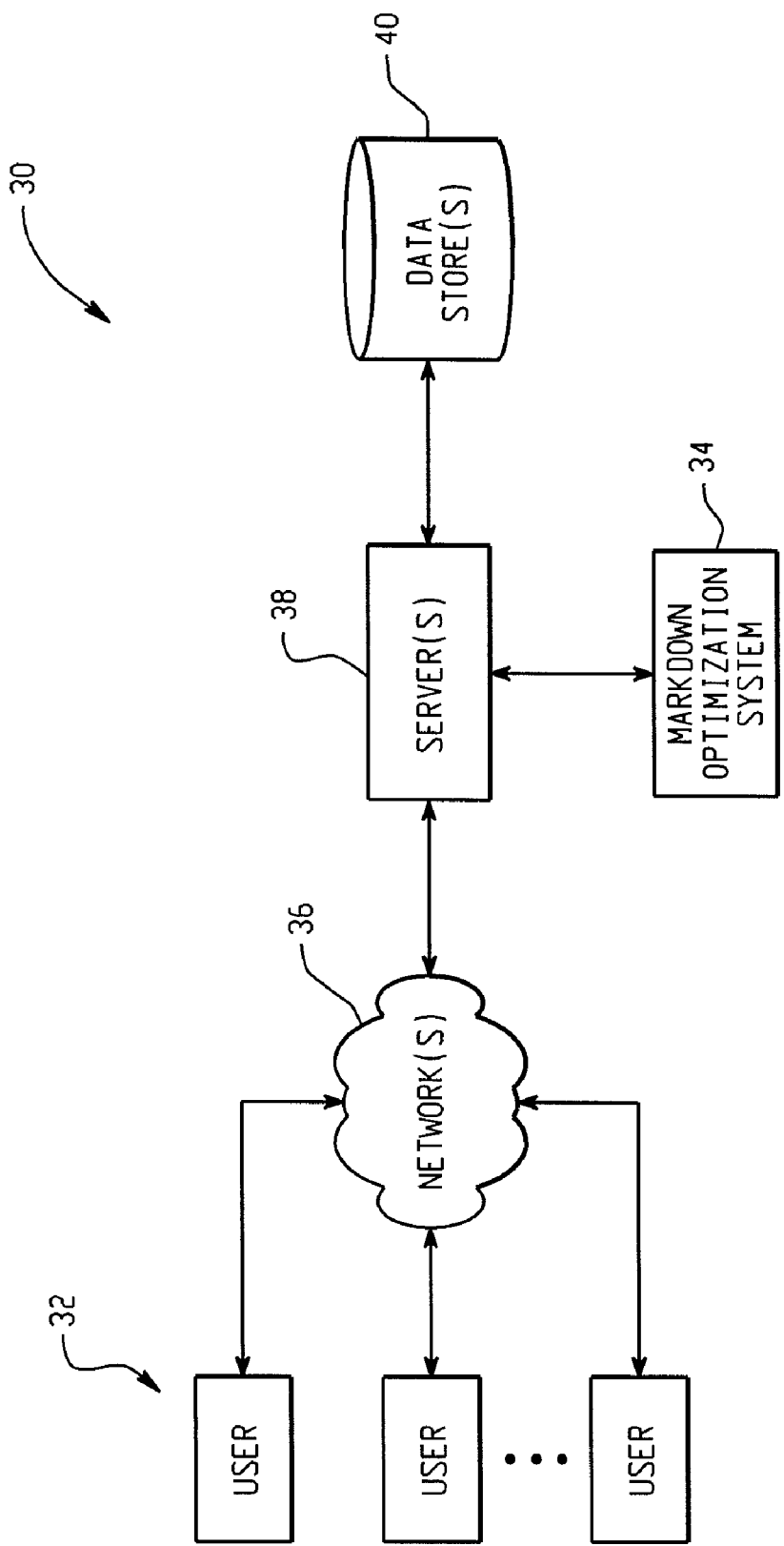
FIG. 1 is a block diagram illustrating an example system and method for markdown optimization.

FIG. 1 depicts at 30 an environment where users 32 can interact with a markdown optimization system 34 to generate markdown plans for one or more items that are for sale. The markdown optimization system 34 generates a markdown plan designed to optimize revenue, margin, and inventory targets for the items covered by the markdown plan. The targets and the items that the markdown plan covers are specified by users 32.

Based upon the input by the users 32, the markdown optimization system 34 establishes weekly prices (or prices at some other time interval) in the clearance period so as to maximize expected revenue for one or more items (e.g., products for sale). Within the system 34, pricing can be done at any level of an item hierarchy and at any level of a product location hierarchy.

The users 32 may interact with a markdown optimization system 34 in a number of ways, such as over one or more networks 36. Server(s) 38 accessible through the network(s) 36 may host the markdown optimization system 34. One or more data stores 40 can store the data to be analyzed by the markdown optimization system 34 as well as any intermediate data or markdown plans generated by the system 34.

Figure 2:
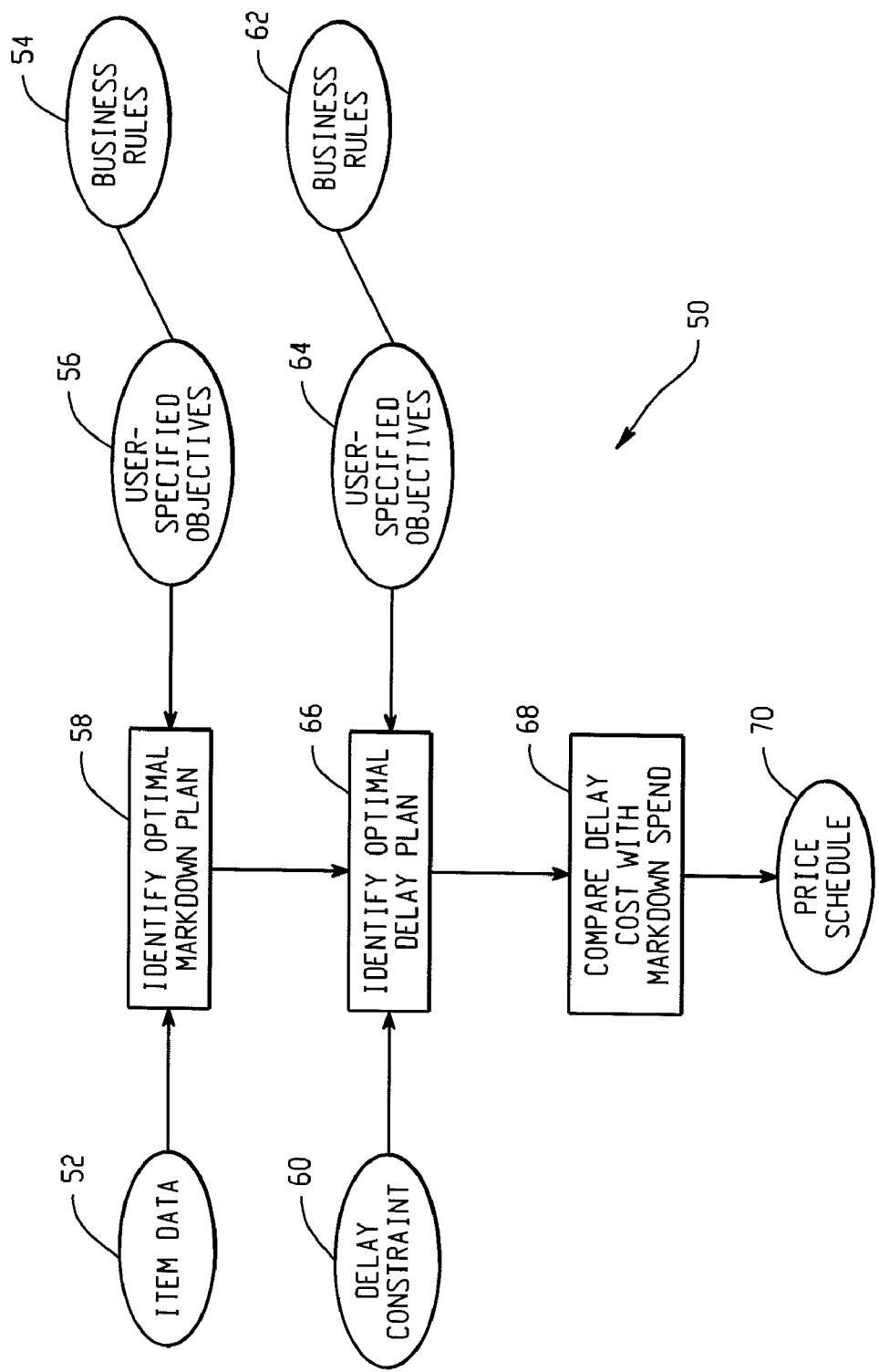
FIG. 2 is a block diagram depicting an example method for creating a markdown plan.

FIG. 2 is a block diagram depicting an example method 50 for creating a markdown plan to satisfy business objectives for one or more items. Item data 52 (e.g., product data) is input, along with user-specified objectives 56. The user-specified objectives 56 establish which business rules 54 are to be used during the markdown optimization process. At 58, the markdown optimization system uses the inputs to identify the optimal markdown plan. To create the optimal markdown plan, the system analyzes the optimal markdown for each item based on the input business rules 54 and user-specified objectives 56. The optimal plan is created without considering the factor that it may not be possible to institute a markdown plan for all items in one time period. The introduction of an additional constraint, the delay constraint 60, allows the system to include this factor in its analysis The delay constraint 60 that can be used when creating a markdown plan allows for further optimization of the markdown plan's effectiveness in satisfying the business objectives of an organization. The optimal markdown plan identified at 58 is modified to take into account the delay constraint

60. The system additionally makes use of the user-specified objectives (e.g., business rules) when modifying the markdown plan to include the delay constraint 60. The system uses these inputs to identify the optimal delay plan at 66. The delay plan refers to the modified markdown plan that results from the markdown optimization system integrating the delay constraint into the markdown planning.

The markdown optimization system compares the optimal markdown plan and the optimal delay plan to determine the delay cost. The delay cost is the expected opportunity loss between the optimal markdown plan and the optimal delay plan. For instance, the delay cost could be expressed as the difference in the revenue expected to be generated under the optimal markdown plan and the revenue expected to be generated under the optimal delay plan. The delay cost is used to express the objective value difference between the two plans.

The markdown optimization system compares the delay cost with the markdown spend, as shown at 68. Markdown spend refers to the reduction in value of the inventory on hand at the beginning of the markdown period due to the planned markdown. In other words, if a markdown of 25% is planned for an item that normally would retail for $89.99 and there are 210 units on hand at the beginning of the markdown period, then the markdown spend would be represented by the equation:

Markdown Spend=210*(25%*$89.99)=$4,724.48 where the amount $4724.48 in this example equals the revenue that can no longer be realized on the inventory on hand once the markdown is put in place.

The markdown optimization system uses the markdown spend figure to compute a ratio of delay cost to markdown spend for a given item. The items analyzed are sorted based on this ratio, in decreasing order. The ratio then is used to determine whether a given markdown should be put in place for the period studied. For example, an organization may impose a budget constraint on markdown spend for a given period. The items, having already been ranked based on the ratio of delay cost to markdown spend, will be chosen based on the markdown spend that is calculated for each. Thus, for example, if the organization imposing a budget on markdown spend set the budget at $5,000, and the item listed in the above example had the highest ratio of delay cost to markdown spend of the items analyzed, then the item would be chosen to be marked down, since the markdown spend figure is below the budget for the period. Alternatively, if the budget for the period were $4,000, then the item listed above would not be chosen, even if it did have the highest ratio of delay cost to markdown spend. Instead, the markdown optimization system would look at the markdown spend figure of the item with the second-highest ratio or give a partial markdown for the current item depending on the business preferences.

It also is possible that more than one item might be chosen to be marked down. For example, if the markdown budget for the period in the above example had been $10,000, then the item above, if it had the highest ratio of delay cost to markdown spend, would be chosen for inclusion. There would be a significant portion remaining of the markdown budget for the period, though, so the markdown optimization system would examine the markdown spend figure of the item with the second-highest ratio of delay cost to markdown spend. If the markdown spend figure for the item with the second-highest ratio is less than or equal to $5,275.52 (which is $10,000 less the $4,724.48 markdown spent on the item with the highest ratio), then that item also would be chosen for a markdown. If not, the markdown optimization system would continue to examine the markdown spend figures of the items in the list until either the entire markdown budget for the period had been allocated or there were no more items in the list.

Items that are chosen to be marked down in a given period have their markdown prices included in the price schedule 70. The price schedule 70 is used to set the prices for the items analyzed.

Figure 3:
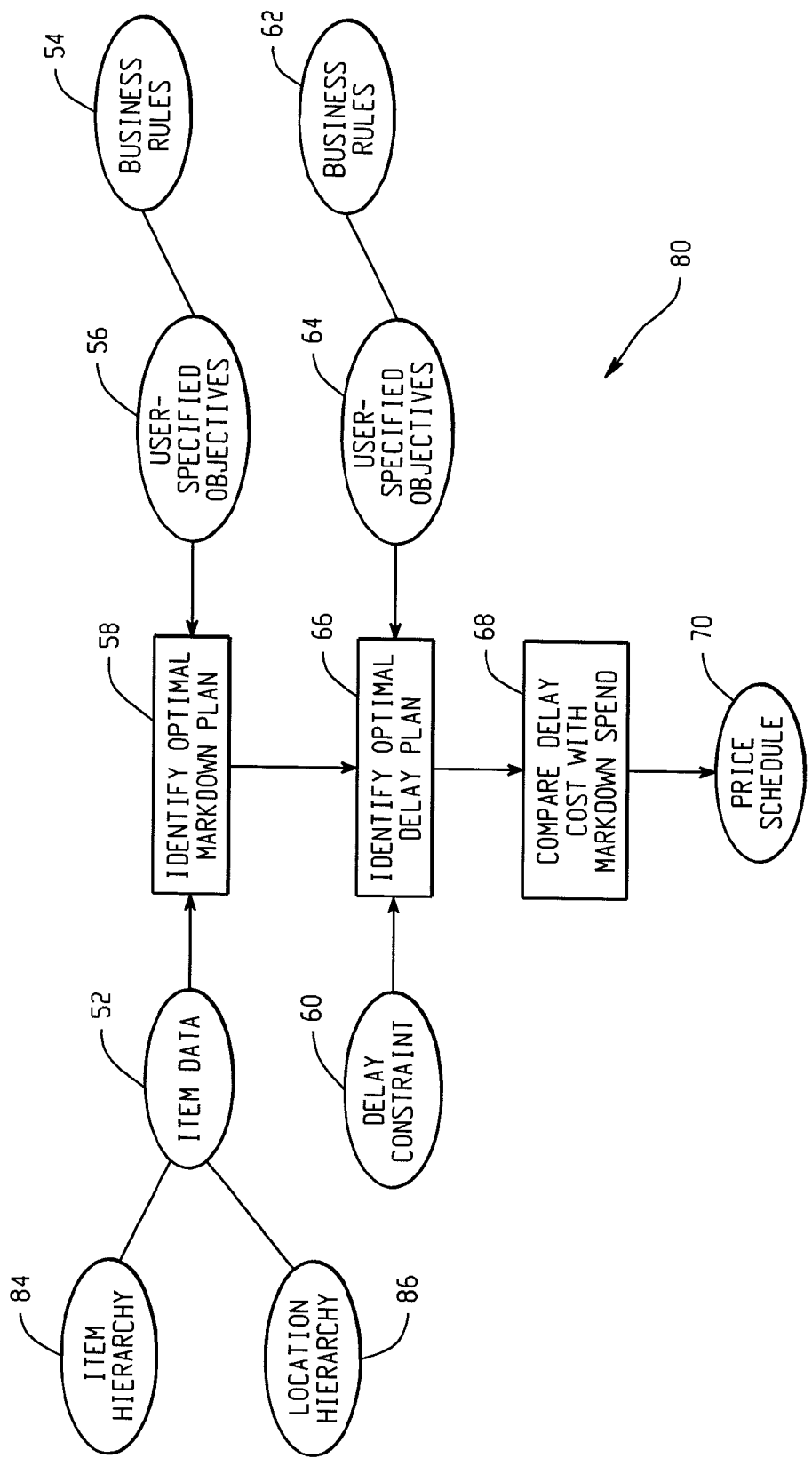
FIG. 3 is a block diagram showing another example method for creating a markdown plan for one or more items.

FIG. 3 is a block diagram showing another example method 80 for creating a markdown plan for one or more items. The item data 52 that is input into the markdown optimization system may be further extended to include item hierarchy 84 and location hierarchy 86. The addition of the item hierarchy 84 allows the markdown optimization system to model markdowns in a manner representative of the way in which many organizations structure their retail business. For example, the organization may wish to produce a markdown plan for men's apparel, a category that could include hundreds of sub-categories (e.g., socks, shirts, ties, etc.). Further, each sub-category could itself include further sub-categories (e.g., dress shirts and casual shirts) and/or potentially hundreds of individual items that fit within the sub-category. Including the hierarchical information within the item data input allows the markdown optimization system to better model an organization's business. It also has the potential to make the complicated analysis of thousands of individual items easier by permitting rules to flow down within a category or sub-category and be applied to the sub-categories and/or individual items within a category.

The location hierarchy 86 includes information that is intended to better represent the way in which organizations structure their operations. For example, the entire organization could constitute the top level of the hierarchy, while the next level could be defined by region, country, or state. Further, within that level, there could be further sub-levels. For example, if the first level is the organization and the second level is a country (e.g., the United States), then the third level could be each of the 50 states or a region within the United States, such as the Northeast or Midwest. At the bottom level of the hierarchy would be the individual establishments that make up the organization.

When the item hierarchy and the location hierarchy are combined, the resulting set of item data can be very large. This problem is a very difficult optimization problem and it often is impossible to solve if the product and/or location scopes are large, which is very typical for a large retailer, for instance. For this reason, a two-step optimization algorithm is applied. First, using as inputs the business rules 54 and the user-specified objectives 56, the markdown optimization system identifies the optimal markdown plan at 58. Business rules may include, for example, limits on discount amounts, limits on the frequency of discounts, and limits on the dates of discounts. The optimal markdown plan is devised by the markdown optimization system to satisfy the business rules 54 and the user-specified objectives 56, but it is generated without regard to any budget constraint for the markdowns. The budget constraint is ignored and weekly optimal prices are calculated for each product/location pair i independently.

For solving the markdown problem, it is noted that the goal of markdown optimization is to find weekly optimal prices, called a price schedule, for combinations of a product and a location, each called a product/location pair, in order to maximize expected revenue. Expected revenue from a group of product/location pairs in the clearance period can be mathematically represented as:

$$\sum_{i=1}^{N}\sum_{t=1}^{T} p_{i,t}\, s_{i,t}$$

where:
N=number of product/locations to be priced
T=number of weeks in the clearance period
$p_{i,t}$=price of product/location pair i in week t
$s_{i,t}$=expected sales units of product/location pair i in week t at price $p_{i,t}$ The expected sales for a product/location pair in a given week depend on the available inventory and forecasted demand for that week. Forecasted demand depends on base forecast (forecast without any price reduction), price, and how elastic the demand of the product at that location is. This relationship can be mathematically represented by the equation $$s_{i,t} = \min\left\{I_{i,t},\, \alpha_{i,t} e^{\beta_i\left(\frac{p_{i,t}}{p_{i,0}}-1\right)}\right\} \quad \forall\, i, t$$

where
$I_{i,t}$=inventory of product/location pair i at the beginning of week t
$p_{i,0}$=list price of product/location pair i
$\beta_i$=price response coefficient of product/location pair i
$\alpha_{i,t}$=base forecast at list price for product/location pair i in week t In the above forecast demand equation, a typical log-linear demand model is assumed, but other demand models may be used as well. Weekly prices of each product/location pair $(p_{i,1}, p_{i,2}, \ldots p_{i,T})$ follow business rules. Some examples of these business rules include: weekly prices must be non-increasing; weekly prices are to be chosen from a given set of admissible price points; limits on frequency of price changes (e.g., maximum number of price changes can be taken, minimum weeks between two consecutive markdowns); and, limits on dates of price changes (e.g., pre-determined dates that cannot take markdowns, dates by which a markdown must have been taken).

Now let $R_i$ be the expected optimal revenue obtained by solving the problem for product/location pair i, and consider the optimization problem with an additional constraint that no price change can be given in week 1 (in other words, $p_{i,1}=p_{i,0}$). Let the optimal expected revenue of the second problem be $R_i'$.

Mathematically it is evident that $R_i \geq R_i'$ and the difference $d_i = R_i - R_i'$ is the cost of delaying a price change in week 1. This difference will be zero if there was no price change recommended in week 1 in the original optimization problem because the additional "no price change in the first week" constraint will be redundant in the second problem and hence the expected revenues $R_i$ and $R_i''$ will be the same. In the other cases the difference will be positive and is a measure of how important it is to give the price change in the first week. Economically speaking, if one delays a price change that was recommended in week 1 then one is expected to lose $d_i$. In other words $d_1$ is the additional expected revenue if the price change for product/location i is not delayed.

The optimization in its simplest form can be described as, given a clearance horizon of T periods, choosing prices $p_1, p_2, \ldots, p_T$ from $\{P_1, P_2, \ldots, P_K\}$ such that the revenue derived is maximized and the business rules are met. Expressed mathematically, this would take the form:

$$\max \sum_{t=1}^{T} p_t S_t + s\, I_T$$

where:
$S_t$=sales during period t
s=salvage value of item at end of the clearance horizon
$I_t$=inventory at the end of period t Further, the following equations and inequalities define additional constraints on the optimization process:

$$I_t = I_{t-1} + Q_t - S_t \qquad t = 1, \ldots, T$$
$$S_t = \min(I_{t-1} + Q_t, D_t) \quad t = 1, \ldots, T$$
$$p_t \leq p_{t-1} \qquad t = 1, \ldots, T$$
$$p_t \in \{P_1, \ldots, P_K\} \qquad t = 1, \ldots, T$$
$$I_T \leq C$$

where:
$D_t$=demand during period t
$Q_t$=shipment coming in at the beginning of period t
C=target inventory value at the end of the clearance horizon As the first step of the two-step optimization algorithm does not consider any budget constraints for the markdowns, the second step of the two-step optimization algorithm is to choose the markdowns to be implemented in such a way as to satisfy a budget constraint imposed on the markdown plan. Thus, the second step 66 of the algorithm identifies the optimal delay plan, which involves including the delay constraint 60 in the optimization modeling done by the markdown optimization system. As with the optimal markdown plan identified at 58, the optimal delay plan satisfies business rules and user-specified objectives, in addition to satisfying the delay constraint 60. Once the optimal delay plan is identified, the markdown optimization system, at 68, compares the delay cost with the markdown spend budgeted for the period of the analysis. This allows the markdown optimization system to rank the optimized markdowns against one another to produce a sorted list. The sorted list is used to choose the most beneficial markdowns that may be implemented within the constraints of the markdown spend budgeted for the period. The markdown optimization system then includes the chosen markdowns in the price schedule 70 it outputs, which will be used to set the prices for the items analyzed by the markdown optimization system.

Figure 4:
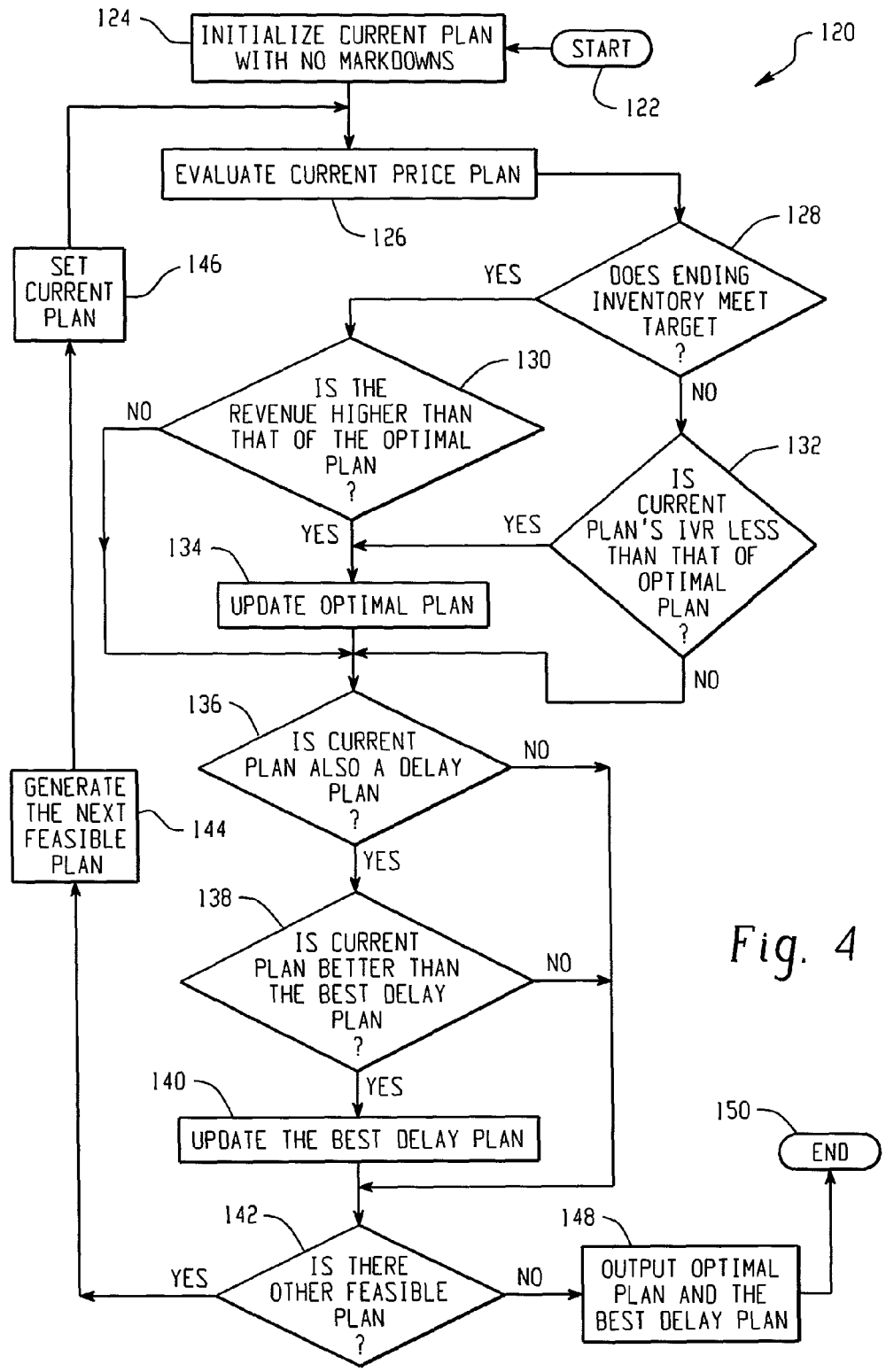
FIG. 4 is a flow diagram depicting an example method for finding the optimal plan and delay cost without reference to a budget constraint.

FIG. 4 is a flow diagram depicting an example method 120 for finding the optimal plan and delay cost without reference to a budget constraint. The method begins at 122. At 124, the current price plan is initialized with no markdowns. Next, the current price plan is evaluated at 126. At 128, the inventory remaining at the end of the modeling period is compared to the inventory target that was determined ahead of time. If the ending inventory meets the target, then the method determines at 130 whether the current price plan produces revenue higher than that of the optimal plan. If the ending inventory does not meet the inventory target, then the method determines at 132 if the inventory value at risk (IVR) of the current plan is less than that of the optimal plan. IVR is defined as the value of the inventory that remains at the end of the period modeled that is above the target inventory level that was identified at the start of the modeling process. If the current price plan does produce greater revenue than the optimal plan, or if the IVR of the current plan is less than that of the optimal plan, then the optimal plan is updated at 134 and replaced with the current price plan.

If at 132 the method determines that the IVR of the current plan is not less than the IVR of the optimal plan, or after the optimal plan has been updated at 134, the method determines at 136 if the current price plan also is a delay plan. If the current price plan is also a delay plan, then the method will determine at 138 whether the current price plan is better than the best delay plan. If the current price plan is better than the best delay plan, then the method updates the best delay plan with the current price plan at 140.

If at 136 the method determines that the current plan is not a delay plan, and if the current plan is not determined to be better than the best delay plan at 138, the method determines at 142 if there are other feasible plans (after the best delay plan is updated at 140). If there are other feasible plans, the method generates at 144 the next feasible plan, which the method sets as the current plan 146. The method then returns to evaluate the current plan at 126, and then reiterates the steps after that point. If the method determines at 148 that there are no other feasible plans, then the method outputs the optimal plan and the best delay plan, as depicted at 148 and the method then ends at 150.

Figure 5:
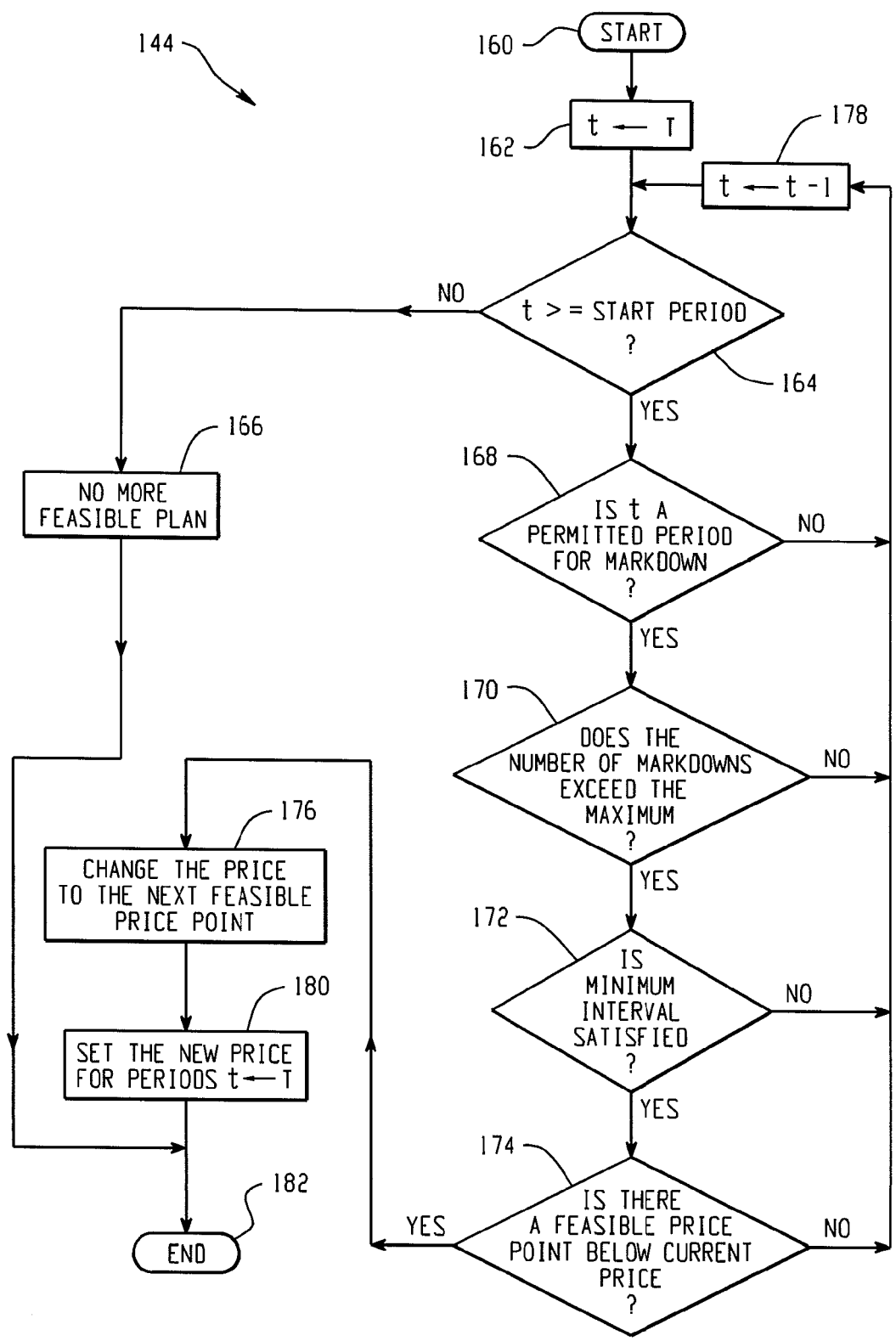
FIG. 5 is a flow diagram depicting an example method for generating a feasible pricing plan from the current pricing plan.

It should be understood that, similar to the other processing flows described herein, one or more of the steps and the order in the flowchart may be altered, deleted, modified and/or augmented and still achieve the desired outcome. For example, FIG. 5 is a flow diagram depicting at 144 a set of steps for generating the next feasible plan from a current plan. The method begins at 160, and at 162 the method sets the time period t equal to the final time period T in the analytical period. The method verifies at 164 that t is set to a time period within the analytical period. If t is not set to a time period within the analytical period, then the method determines that there is no more feasible plan 166 and proceeds to end block 182. If t is set to a time period within the analytical period, the method next determines at 168 whether time period t is a permitted period for a markdown. If t is a permitted period for a markdown, the method determines at 170 whether the number of markdowns exceeds the maximum number permitted. If the number of markdowns does exceed the maximum number permitted, the method determines if the minimum interval between markdowns is satisfied, as depicted at 172. If the minimum interval between markdowns is satisfied, the method determines whether there is a feasible price point below the current price, as shown at 174. If there is a feasible price point below the current price, then the method changes the current price to the next feasible price point 176. If, on the other hand, the method determines that any of the conditions at 170, 172, 174, or 176 is not met, the method proceeds to set time period t to the next earlier time period, as depicted at 178, and the method loops to verify that t is set to a time period within the analytical period 166. Once the current price is changed to the next feasible price point, as shown at 178, the method, at 180, sets the new price for periods t . . . T and proceeds to end 182.

FIG. 6 is a pseudocode listing of an example method for selecting product/location pairs for inclusion in a markdown plan while conforming to a budget constraint. The pseudocode listing describes the steps in the method that is used to select product/location pairs that fit within the markdown spend budgeted for the period being analyzed. Beginning with a budget B, which is the amount of markdown spend authorized for the period being analyzed, the method iteratively reduces the amount of budget left to be used by the amount of markdown spend required to implement a markdown for a given product/location pair. Once the amount of budget reaches zero or less, the iteration ceases, as no more markdowns may be included in the markdown plan. The method further checks that the final product/location pair for which a markdown was included in the markdown plan did not result in a negative budget. If a negative budget did result from the inclusion of the markdown spend for the final product/location pair in the markdown plan, then the method computes the percentage of the markdown spend for the final product/location pair that would fit within the remaining markdown spend budget and includes a partial markdown for that product/location pair in the markdown plan.

After the above optimization problems are solved and the delay costs ($d_i$'s) are calculated, the markdown optimization system then decides which price changes should be delayed to the next week. This decision depends on the value of $d_i$'s as well as how much markdown spend each product/location pair i consumes in week 1, which are represented by the term $b_i$. This is an optimization problem called a knapsack problem in the operations research literature. From the perspective of computational complexity, the knapsack problem is an NP-hard problem. Mathematically the problem can be formulated as max:

$$\sum_{i=1}^{N} d_i x_i$$

subject to:

$$\sum_{i=1}^{N} b_i x_i \leq B$$

$$x_i \in \{0, 1\} \ i = 1, \ldots, N$$

where $x_i$ are binary decision variables representing if product/location pair i's price change should be approved or delayed. In other words, if $x_i=1$ then the price change for product/location i will be approved for week 1 and if $x_i=0$ then it will be delayed until next week. Finding the optimal solution to the knapsack problem is not trivial. A slightly different version of this problem is solved where the constraint $x_i \in \{0, 1\}$ is replaced (relaxed) by $0 \leq x_i \leq 1$. Here, $x_i$ can take any number between 0 and 1 (inclusive). When applied to the markdown optimization problem, the use of the relaxed value set corresponds to partial approval of a markdown. For example, if $x_i$ is 0.7, that means approve the price change with 70% of the optimized markdown. For example, if the current price is 30 and the markdown price is 20 dollars then the approved markdown will be 0.7×(30−20)=7 dollars and the clearance price will be 30−7=23 dollars.

Note that this relaxation assumes that $d_i$ is linear with the price discount which is not true, however it is a very good approximation. The use of the relaxed value set allows the generation of the optimal solution to be trivial. For each product/location pair i, the system takes the ratio $d_i/b_i$ and sorts the resulting ratios from largest to the smallest, picking markdowns in this order until the budget is filled completely.

FIG. 7 depicts at 210 an example graphical interface displaying the details of a markdown plan generated by the markdown optimization system. At 212, details of the products analyzed by the markdown optimization system are displayed. In the example, three products, A, B, and C, were analyzed. For each product, the interface displays the regular price (i.e., the typical retail price without markdowns) and the current price (i.e., the price of the product at the beginning of the period for which the analysis is performed) of the product. The interface also displays at 212 the current inventory, which is the inventory of the product at the beginning of the period of the analysis, and the end inventory target, which is the level of inventory input into the system by a user as being desired for the end of the period being analyzed.

At 214, the interface shows the output of the method described above with respect to FIG. 4, the generated price schedules for each product for the period of the analysis. For each product, the method outputs both the optimal price plan and the best delay plan. As shown, these outputs may be presented as a percentage markdown, wherein the value displayed for each week of the plan shows the percentage discount the method determined should be applied to the current price for that week of the analyzed period. It should be noted that, when the price plans are presented in this manner, each percentage shown is the total percentage markdown for a given week from the current price at the beginning of the analytical period. In other words, the markdowns are not cumulative from week to week when displayed in this manner.

Additional details regarding the results of the analysis are displayed in the interface at 216. For each product, the ending inventory predicted by the modeling process is displayed, under both the optimal plan and the best delay plan. The method also generates a predicted amount of total revenue that the organization would derive from sales of each product during the period of the analysis. The difference between the total revenue generated for a product under the optimal plan and the total revenue generated for that product under the best delay plan is referred to as the delay cost for that product. The markdown spend in the first week of the optimal plan also is displayed by the interface. The markdown spend refers to the change in the retail value of the inventory based on the markdown in the first week of the analytical period compared to the value of that inventory under the delay plan. The delay cost is then divided by the markdown spend to produce the ratio that will be used by the markdown optimization system to determine the relative merits of the price schedules for the various products. Finally, the interface depicts at 216 the inventory value at risk (IVR), both with and without pooling. Inventory pooling refers to the ability of a user to define sub-groups among locations within which inventory risk can be pooled where one or more products have common pricing strategies in more than one location. This allows the system to model an aggregated inventory target for locations in the same sub-group, thereby replacing the requirement that locations meet inventory targets individually. Because this is a less restrictive manner of modeling, a better optimal plan may be achieved.

FIG. 8 depicts at 250 an example graphical interface through which a user could set initial parameters for generating a new clearance plan using a markdown optimization system. There are three types of clearance plans that a user can work with: optimized, manual, and baseline. When a user creates an optimized plan, the system calculates price changes for the user. Suggested price changes are based on the goals that the user specifies for a clearance plan. The user may then review the suggested price changes and designate which prices to approve or reject. Only approved prices can be implemented. When a user creates a manual plan, he or she enters desired price changes manually. The user can evaluate a manual plan to see projected plan performance. Then, if desired, the user can make adjustments to the plan. Again, it is only the prices approved by the user that can be implemented. When a user creates a baseline plan, prices for the included products and locations are maintained over the duration of the clearance plan. This type of plan enables the user to view projected sales performance when no price changes are made.

Within the example graphical interface, a user will enter details about the new clearance plan. The first phase of defining a new plan involves specifying a plan type and plan goals. Next, the user enters settings that pertain to plan dates and pricing options. After entering these details, the user indicates what he or she would like to do next with the new clearance plan.

Plan Type and Goals

The clearance plan type and plan goals are entered by the user in the Choose a Markdown Plan type and goals section of the Create Plan dialog box, according to the following steps:

1. The user selects the plan type—optimized, manual, or baseline—from the drop-down list.

2. If the user is creating an optimized plan, he or she enters a primary plan goal from the Primary goal drop-down list. The user can select to maximize revenue and margin, to maximize net revenue and net margin, or to minimize inventory at risk.

3. If the user selected Minimize Inventory at Risk as the primary plan goal, he or she select a secondary plan goal from the Secondary goal drop-down list. The user can select to maximize revenue and margin or to maximize net revenue and net margin.

4. If the user is creating an optimized or a manual plan, he or she enters a target inventory level to reach by the end of the plan. This is the value that is used to determine the amount of inventory that exceeds plan goals, or at-risk inventory. The user enters a numeric value in the first box, then selects % or Units from the drop-down list to specify whether the number represents a percentage of the beginning inventory level or a number of inventory units. When a user indicates a number of units, this refers to the total number of units of inventory for each product multiplied by the number of locations that are included in the plan.

Note that the net revenue goal is available only when at least one of the following metrics is greater than zero: cost of capital rate, markdown cost, or markdown unit cost. Also, when a secondary goal is entered for an optimized plan, the system optimizes so that the following conditions are met: the primary goal is attained and, for outcomes where the primary goal is attained, the secondary plan goal is maximized.

Plan Dates and Pricing Options

The user also enters details that pertain to dates and pricing options in the Set plan details section of the Create Plan dialog box:

1. The user enters the start and end dates for the clearance plan in the Start date and End date boxes, respectively. The default length of a plan is 16 plan periods.

2. For an optimized or a manual plan, the user enters the dates on which markdowns are allowed. The user may indicate that markdowns can occur on all available markdown dates during the clearance plan by selecting All dates allowed. Also, the user may indicate that markdowns can be made only on a subset of markdown dates by selecting Select dates. The Select Date dialog box appears.

3. For an optimized or a manual plan, the user enters the desired unit salvage value percentage in the Unit salvage value for end date box. This value is used to calculate the margin that is generated by a plan. Valid entries are greater than or equal to 0 and less than 100. Note that discounted prices must fall between the salvage value and the last regular price of a product.

4. To set prices for each product to the same value at all locations in an optimized plan, the user selects Activated from the Uniform price or discount schedule dropdown list. To leave this feature inactive, the user selects Not activated. Note that when the user selects this option for products with different initial prices, new prices must be based on a discount percentage grid rather than a grid of actual prices.

5. To force at least one markdown for each product in an optimized plan, the user may select Activated from the Force at least one markdown drop-down list. To leave this feature inactive, the user selects Not activated.

Next Step Selection

To complete the new plan definition, the user indicates what to do next with the plan in the Select next step section of the Create Plan dialog box. The options that are available depend on the type of plan that the user creates.

For an optimized plan, the user can save the plan by selecting Save and run optimization. First, the user specifies from the drop-down list when he or she wants the plan to be optimized, choosing from the options: Now, Overnight, After next data load, and Later (i.e., upon request). Second, the user can set the optimized plan to become the active plan by selecting Make optimized solution the Active Plan. If the user selects this option, he or she can also activate these options: pre-approve first markdown for plan, which automatically sets the status for the first set of markdowns to approved and automatically optimize plan with new data, which optimizes a plan each time that new data is added to the system. For an optimized or a manual plan, the user can view the Plan Details window immediately by selecting Open Markdown Plan Details page. The Plan Details window opens when the user closes the Create Plan dialog box.

For a baseline plan, the Save and run evaluation option is selected automatically. The user specifies from the drop-down box when he or she wants the plan to be evaluated, choosing from the options: Now, Overnight, After next data load, and Later (i.e., upon request). Next, the user can set the evaluated plan to become the active plan by selecting Make evaluated solution the Active Plan. If the user selects this option, he or she can also activate these options: pre-approve first markdown for plan, which automatically sets the status for the first set of markdowns to approved and automatically evaluate plan with new data, which evaluates a plan each time that new data is added to the system.

When the user has completed his or her entries in the Create Plan dialog box, he or she clicks OK to create the plan. If the user selected Open Markdown Plan Details page in the Select next step section, then the Plan Details window appears. Alternatively, the user may click Cancel to cancel the creation of the plan.

Figure 9:
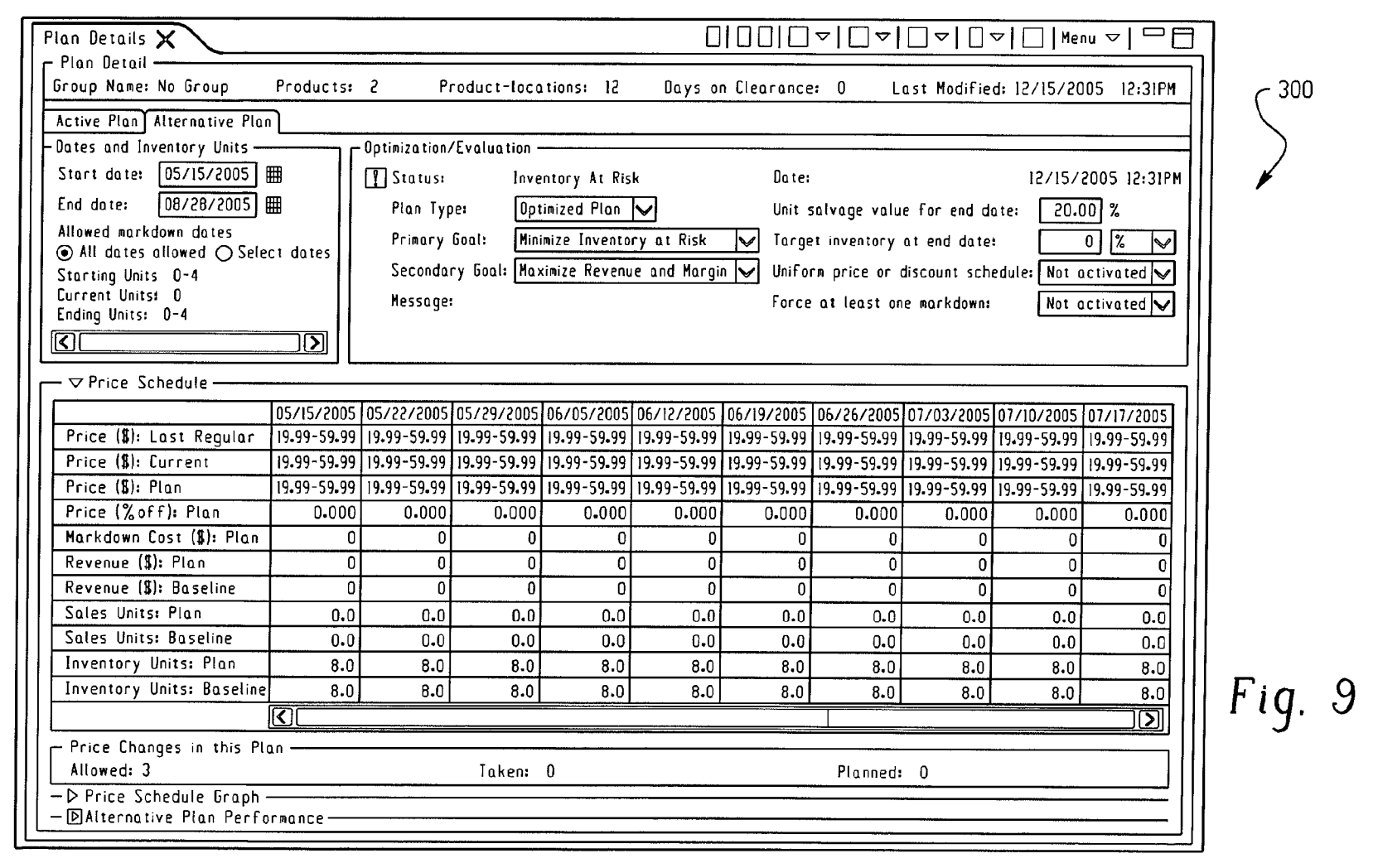

FIG. 9 depicts at 300 an example graphical interface displaying the details of a newly-created clearance plan to a user of the system. The user can review the settings and progress of a clearance plan in the Plan Details window. This window displays detailed information about a clearance plan, including summary information and comparisons between baseline, actual, and estimated plan values. Some of the information that appears in the Plan Details window varies depending on the plan tab that the user is viewing. Note that the name of the Plan Details window varies based on the plan that is being displayed. If a plan contains just one product, then the title displays the SKU for that product. If a plan is a group plan, then the title displays the group name.

Within the Plan Details window, there are two tabs—the Active Plan tab and the Alternative Plan tab. These tabs may be considered to be displaying two versions of a clearance plan. The Active Plan tab displays the version of a plan that is ready for execution or that is currently being implemented. The Alternative Plan tab displays the version of the plan with any alternative settings that the user might have made. The alternative version of a plan functions as a workspace for that plan, enabling the user to review potential changes before committing to them. If the user decides that an alternative plan is preferable to an active plan, then he or she can select to make that version of the plan the active plan.

The user can perform the following tasks on the Active Plan tab:
    approve tentative price changes
    track clearance plan progress and compare performance to data sets containing estimates of baseline performance and actual performance data (for an ongoing clearance plan).

The user can perform the following tasks on the Alternative Plan tab:
    determine price changes, either for a manual plan by entering price changes manually, for an optimized plan, by modifying the plan rules that control pricing and markdown constraints, or for an optimized plan, by optimizing the plan to have the system calculate optimal price changes:
    evaluate the projected performance of a manual plan
    compare alternative plan performance with data sets containing estimates of baseline performance and estimates of active plan performance.

The Typical Work Flow for Clearance Plans

After a clearance plan has been created, and even while a plan is in progress, the user can review and modify the details for that plan. At this point, the products, locations, and time frame for a clearance plan have been defined. Now the user can focus on the price schedule for a clearance plan. While the types of merchandise and locations included can vary widely between clearance plans, there is a basic work flow that the user usually will follow when working with a clearance plan. In general, the user completes the following steps when he or she works with a new clearance plan in the system:

1. Open the Plan Details window. The user can modify most settings for a clearance plan in this window.

2. Set a price schedule for the products that are included in a plan on the Alternative Plan tab in the Plan Details window. The type of clearance plan dictates how the user controls pricing for products that are in a clearance plan:
    For an optimized plan, the user can modify the plan rules, which is optional, and then optimize the plan to set the price schedule.
    For a manual plan, the user enters markdowns in the price schedule, and then evaluate the plan to see the results of his or her entries.

3. The user then reviews the performance of the alternative plan. Depending on the results, the user may repeat Steps 2 and 3 until he or she is satisfied with the settings for the alternative plan.

4. If the user decides that the alternative plan is preferable to the active plan, replace the active plan with the alternative plan.

5. The user approves tentative price changes on the Active Plan tab so that price changes can be implemented. The user may approve a subset of pending price changes, or he or she can approve all pending price changes.

6. For an ongoing plan, the user can perform these tasks:
    (a) Open the Plan Details window and review the ongoing performance of the active plan.

(b) If necessary, modify plan settings on the Alternative Plan tab, evaluate or optimize, and review the results of those changes.

(c) If desired, replace the active plan with the alternative plan.

Note that the tasks in this last step are repeated periodically over the duration of a clearance plan.

When a user creates a clearance plan, he or she might select some settings that perform one or more of the above steps automatically. For example, if the user selects the Open Markdown Plan Details page option when he or she creates a plan, he or she then begins to work with a plan in Step 2. If the user selects the Make optimized solution the Active Plan option, then he or she begin to work with a clearance plan in Step 6.

Open the Plan Details Window

To work with a clearance plan, the user needs to view the plan in a Plan Details window. If the user selected Open Markdown Plan Details page during plan creation, then this window appears automatically. To view the Plan Details window for a group plan, the user completes the following steps:

1. If necessary, the user opens the Markdown Groups window by selecting Markdown Groups from the View menu.

2. The user selects the group name for the plan that he or she wants to view.

3. By pressing ENTER or selecting Open Group Plan from the Menu drop-down list that is located in the top-right corner of the Markdown Groups window, the user may access the Plan Details window for this group.

Note that the user can also double-click the group name in the list to open the Plan Details window.

Alternatively, to view the Plan Details window from a product list window, the user may complete the following steps:

1. Display the list of products that are included in a clearance plan by selecting the correct product list view. If the user has not yet activated a plan, then he or she selects Inactive Plans from the Show drop-down list. If the user has activated a plan, then he or she selects Active Plans from the Show drop-down list.

2. Select one or more of the products that are in the desired clearance plan.

3. Open the Plan Details window by pressing ENTER or by selecting Open Plan from the Menu drop-down list that is located in the top-right corner of the product list window.

The top of the Plan Details window displays information about the plan, including group name and description, number of products in the plan, number of product-location combinations, number of days on active clearance, and the date that the plan was last modified. There are two sections at the top of the Active Plan and Alternative Plan tabs. The user can view summary information about a plan and make changes to plan settings in these sections.

The Dates and Inventory Units section displays the following items about a plan:

start and end dates: the user can make changes to both of these values if the dates have not yet occurred set of dates on which markdowns can be made: the user can edit the setting for allowed markdown dates counts of inventory units: these are informational values that are updated from data that has been loaded into the system, including starting inventory units, current inventory units, and ending inventory units.

Note that these values might appear as "unavailable" if the plan has not yet been evaluated or optimized.

The Optimization/Evaluation section displays settings for plan optimization or evaluation. The user can use this section to change the settings for a plan, if desired. The Optimization/Evaluation section displays these items about a plan: plan status (the status of the plan for the currently displayed plan tab), date that the status occurred, plan type, plan goal(s), unit salvage value percentage, target inventory level, the setting of the "Force at least one markdown" option, and a message area that indicates optimization or evaluation errors, as well as when there is new data in the system.

Setting a Price Schedule for an Alternative Plan

The list of scheduled markdowns for a clearance plan is displayed in the Price Schedule section in the Plan Details window. The user can expand this section by clicking the right arrow to the left of the Price Schedule label. For a new plan, the user works on the Alternative Plan tab to create a preliminary price schedule. For an existing plan, the user modifies the price schedule by using the Alternative Plan tab. The steps to create a preliminary price schedule or to modify an existing price schedule depend on the type of clearance plan the user is working with—optimized or manual. Each column in the Price Schedule table represents a plan period in the clearance plan. Each row provides information about price changes for a clearance plan. For plans with more than one product, the cells in this table might be displayed as a range.

Metrics Displayed in the Price Schedule Table

| Metric | Description |
| --- | --- |
| Price ($): Last Regular | The last regular price that was charged for the product(s) in this plan. The last regular price is the price that is maintained over the duration of a baseline plan. |
| Price ($): Current | The price that is currently being charged for the product(s) in this plan.<br>Note: If the user has approved a price that has not been exported to the price execution system yet, then that approved price appears in this column. |
| Price ($): Plan | The plan price that is to be charged during the designated plan period |
| Price (% off): | The discount percentage that is to be implemented during the designated plan period |
| Markdown Cost ($): Plan | The cost that is associated with implementing a plan markdown |
| Revenue ($): Plan | Projected revenue, in dollars, that is associated with a plan |
| Revenue ($): Actual | Revenue, in dollars, based on actual performance during an ongoing clearance plan |
| Revenue ($): Baseline | Projected revenue, in dollars, if no price changes are made over the duration of a plan |
| Revenue ($): Active Plan | Projected revenue, in dollars, based on settings from the active plan |
| Sales Units: Plan | Projected sales in units for a clearance plan |
| Sales Units: Actual | Actual sales in units for a clearance plan.<br>Note: Actual values are not available if a plan has not started yet. |
| Sales Units: Baseline | Projected sales in units if no price changes are made over the duration of a plan |
| Sales Units: Active Plan | Projected sales in units based on settings from the active plan |
| Inventory Units: Plan | Projected inventory units for a clearance plan |
| Inventory Units: Actual | Actual inventory units for a clearance plan |
| Inventory Units: Baseline | Projected inventory units if no price changes are made over the duration of a plan |
| Inventory Units: Active Plan | Projected inventory units based on settings from the active plan |

FIG. 10 depicts at 350 an example graphical interface through which a user interacts with the markdown optimization system to modify the plan rules used to create a clearance plan. When the user optimizes a plan, the system selects an optimal price schedule for a clearance plan. However, the user can use the Plan Rules dialog box to modify the plan rules and to select the list of possible markdowns for optimization. The user can access the Plan Rules dialog box from an open plan window by selecting Plan Rules from the Menu drop-down list that is located in the top-right corner of the plan window.

Setting the Price Rules

The Price Rules tab of the Plan Rules dialog box controls settings for the logistics of markdowns in a plan. The user can enter values for the following settings:

- the maximum number of markdowns that are allowed over the duration of a plan
- the minimum number of plan periods that must occur between markdowns
- the maximum overall discount percentage—the discount percentage between the final markdown in a plan and the last regular price for a product
- the maximum discount percentage for a single markdown
- the minimum discount percentage for an initial clearance markdown
- the minimum discount percentage for a single markdown Selecting the List of Possible Markdowns The user may use the Price Points, Percentage Discount, or Percentage Off with Price Endings tab to select the pricing grid that the system uses for optimization. Each tab displays available markdowns in a different format:

Price Points: displays a list of available discount prices

Percentage Discount: displays a list of available discount percentages. These percentages are applied to the last regular price of a product.

Percentage Off with Price Endings: displays a list of discount percentages and sets rules for price endings. For example, a price ending rule might specify that the final discount price must end in '0.99.' Again, the discount percentage is applied to the last regular price of a product.

To select the pricing grid that he or she wants to use for a markdown plan, the user goes to the appropriate tab in the Plan Rules dialog box and selects Use this Price Grid. The user cannot modify the pricing grids that are displayed in the Plan Rules dialog box. He or she opens the Pricing Rules window in order to modify any of these grids. This window is available by selecting Pricing Rules from the View menu.

Optimizing a Plan

When the user works with an optimized plan, he or she enables the system to calculate an optimal set of price changes. The resulting price schedule is selected so that plan goals are met while adhering to the existing business constraints. To optimize an alternative plan, the user selects Optimize and the appropriate time from the Menu drop-down list that is located in the top-right corner of the Plan Details window. He or she chooses whether to optimize a plan now, overnight, or after the next data load. If the user selects Optimize→Now, a dialog box appears to let him or her know that calculations are in progress.

When optimization is complete, the following actions occur:

- estimates of performance metrics appear in the Price Schedule Graph and the Alternative Plan Performance sections
- the plan is saved
- the status of the clearance plan is updated in the Evaluation/ Optimization section of the Alternative Plan tab Note that if there is heavy activity on the server, it might take several moments for the screen to update after optimization is complete.

The following table explains the possible plan status values for an optimized plan:

| Status | Meaning | Next Steps |
| --- | --- | --- |
| Inventory at Risk | A plan optimized, but the final inventory level exceeds the specified inventory goal for this plan. | Modify the plan and re-optimize. Possible ways to modify include the following: increasing the inventory goal extending the duration of the plan modifying the pricing rules for plan products |
| Not optimized | Existing plan has not been optimized. | Optimize the plan from the Menu drop-down list that is located in the top-right corner of the Plan Details window. |
| Optimization failed | Plan goals could not be met. | Modify settings for the plan and re-optimize. Possible ways to modify include the following: increasing the inventory goal extending the duration of the plan the pricing rules for plan products |
| Optimization will occur after next data load | Optimization will occur after new data has been loaded into the system. | No action is needed. |
| Optimization will occur overnight | Optimization will occur as part of jobs that are scheduled to run overnight. | No action is needed. |
| Optimized | Optimization completed successfully. | No action is needed. |
| Optimizing | Optimization for the products in this plan is in progress. | The user cannot modify a plan while it is optimizing. |

FIG. 11 depicts at 400 an example graphical interface a user could use to enter the information needed to generate a manual clearance plan. When the user generates a manual clearance plan, he or she enters price changes manually for each time period in the clearance plan. Values that the user enters are validated against existing pricing rules, such as the minimum initial discount or the maximum number of markdowns per plan. Note that with manual plans, the user is not limited to pricing grids or price ending rules. Pricing grids and price endings are used only with optimized plans.

Editing a Price Schedule Manually

To edit the price schedule manually, a user completes the following steps:

1. The user clicks in the cell that he or she wants to edit and enters a value.
2. If a value that the user enters is not within the pricing rules for a plan, the user receives a warning and enters a new value for the cell.

If there are products that have subproducts, such as a box of tiles that can be sold by the box or as individual tiles, the user also can set prices for those subproducts. By default, a subproduct has the same discount percentage as the product that it is associated with. The user sets alternative prices for subproducts in the Price Changes view of the product list.

Resetting a Plan

If the user decides to reset the alternative plan settings, he or she selects Reset Plan from the Menu drop-down list that is located in the top-right corner of the Plan Details window. The Reset Plan dialog box appears.

Evaluating a Plan

After entering price changes for a plan, the user evaluates the plan against the goals that he or she specified during plan creation. To evaluate an alternative plan, the user selects Evaluate from the Menu drop-down list that is located in the top-right corner of the Plan Details window. A dialog box appears to let the user know that calculations are in progress. When evaluation is complete, the following actions occur:

- estimates of performance metrics appear in the Price Schedule Graph and the Alternative Plan Performance sections
- the plan is saved
- the status of the clearance plan is updated in the Optimization/Evaluation section of the Alternative Plan tab Note that if there is heavy activity on the server, it might take several moments for the screen to update after evaluation is complete.

The following table explains the possible status values for a manual plan:

| Status | Meaning | Next Steps |
|---|---|---|
| Evaluated | Evaluation completed successfully. | No action is required. Possible next steps include the following: making further changes to the alternative plan replacing the active plan with the alternative plan |
| Evaluating | Evaluation in progress. | No changes can be made to a plan while evaluation is in progress. |
| Evaluation error | An error occurred during plan evaluation. | Hold the mouse pointer over the Evaluation error message to view the error that occurred. Possible evaluation errors are listed in the following table. |
| Evaluation will occur after next data load | Evaluation will occur after new data has been loaded into the system. | No action is needed. |
| Evaluation will occur overnight | Evaluation will occur as part of jobs that are scheduled to run overnight. | No action is needed. |
| Not evaluated | Existing plan has not been evaluated. | Evaluate the plan from the Menu drop-down list that is located in the top-right corner of the Plan Details window. |
| Pricing Rule Violated | Evaluation is complete, but there are pricing rule violations. | Hold the mouse pointer over the Pricing Rule Violated status. A message appears that displays business rules that were violated. Modify settings for the plan and re-try the evaluation. Possible ways to modify include the following: increasing the inventory extending the duration of the plan modifying the pricing rules for plan products |

The table below lists errors that may occur during evaluation:

| Error | Meaning |
|---|---|
| Blocked Markdown Period rule violated | The user entered a markdown for a date that does not allow markdowns. |
| Force Markdown rule violated | At least one markdown is required based on the Force at least one markdown setting for a plan. |
| Maximum Single Discount exceeded | The user entered a discount that is larger than allowed for a single discount. The size of the discount is based on the previous plan price. |
| Maximum Number of Markdowns exceeded | The user has entered more markdowns than are allowed for a clearance plan. |
| Maximum Overall Discount exceeded | The difference between the last regular price and the final markdown price was too large. |
| Minimum Absolute Discount exceeded | The minimum overall discount from the last regular price was not met. |
| Minimum Single Discount exceeded | The user entered a discount that is smaller than the minimum that is allowed for a single discount. The size of the discount is based on the previous plan price. |
| Minimum Initial Discount exceeded | The user entered an initial discount that was smaller than allowed for an initial discount. The size of the discount is based on the previous plan price. |
| Minimum Periods Between Markdowns exceeded | The user entered at least two markdowns that do not have the required number of plan periods between them. |
| Minimum Start Period rule violated | There is not enough time between the current date and the date of the first markdown to allow for a markdown to be implemented. |
| The system does not have sufficient data to optimize or evaluate the plan | Check with the solution administrator who can review the log from the user's session to determine what is causing the problem. |

The user can modify the rules for a plan by using the Plan Rules dialog box. Select Plan Rules from the Menu drop-down list that is located in the top-right corner of the plan window.

Reviewing the Performance of a Clearance Plan

Figure 12:
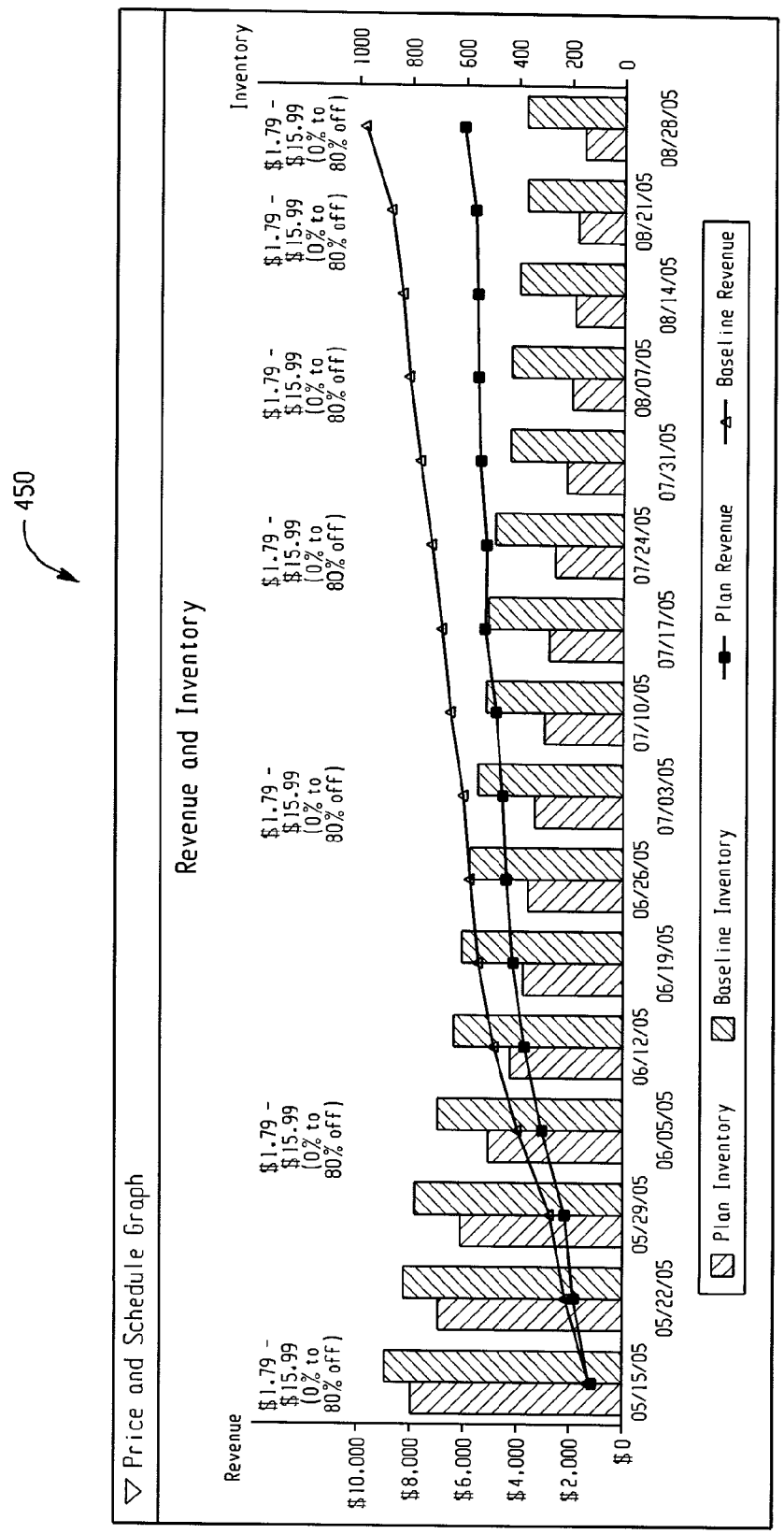
Figure 13:
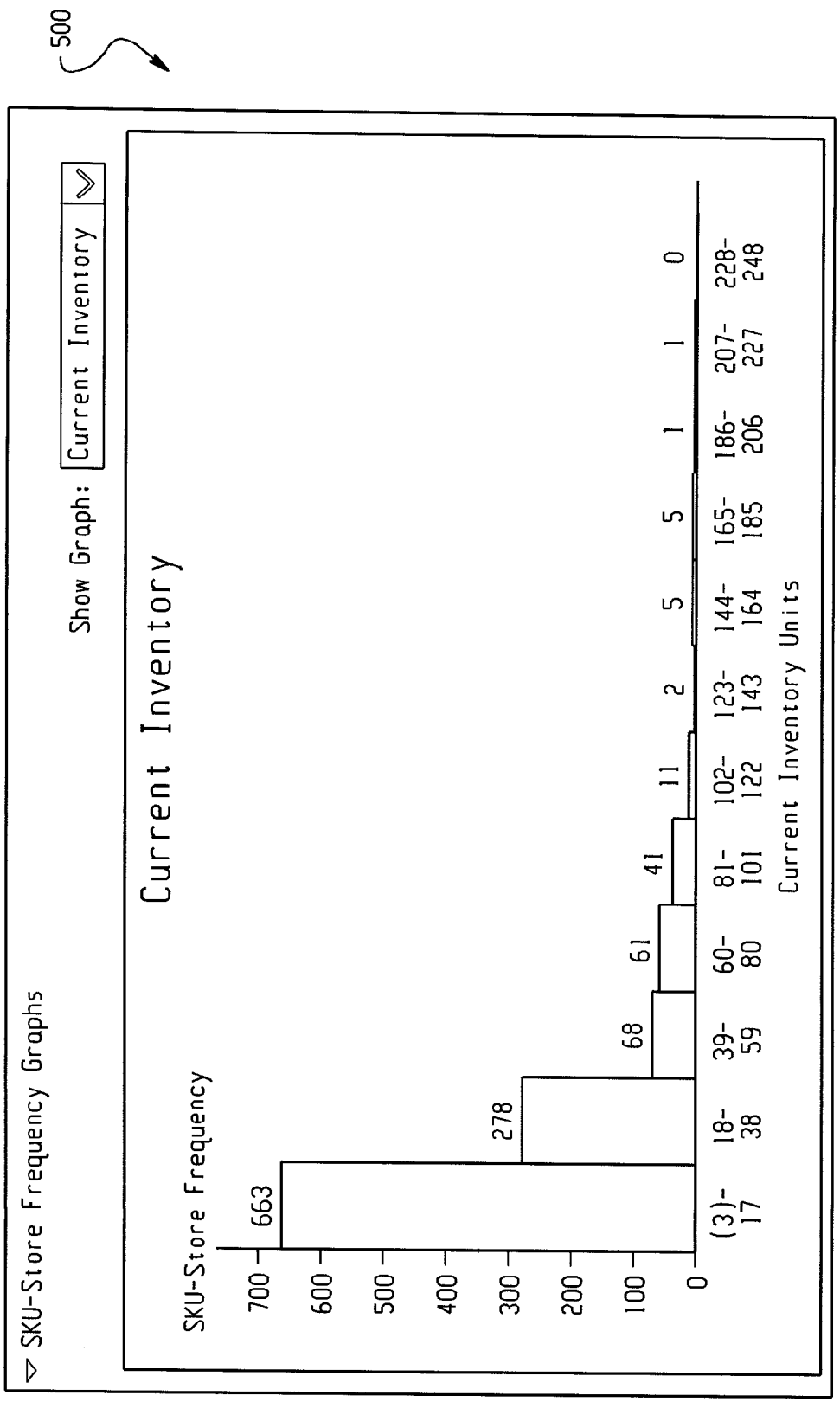

FIG. 12 depicts at 450 an example graphical interface that displays the projected performance of the current clearance plan over the duration of the plan. The Price Schedule Graph plots revenue and inventory over the duration of a plan. This gives the user a quick visual impression of the impact of current plan settings. Revenue, represented by a line graph, is plotted along the left vertical axis. Inventory, represented by a bar chart, is plotted along the right vertical axis. The dates for a plan are plotted along the horizontal axis. Based on the selections that the user makes from the Menu drop-down list that is located in the top-right corner of the Plan Details window, he or she can see plan values compared to these data values:

- Actual values: these are available only on the Active Plan tab for a plan that has already started
- Baseline values: performance estimates assuming no price changes are made over the duration of a plan
- Active plan estimates: only available on the Alternative Plan tab, these values represent expected active plan performance FIG. 13 depicts at 500 an example graphical interface that displays another aspect of the projected performance of a clearance plan. The SKU-Store Frequency Graph provides a count of SKU-store combinations that meet various categories. The default graph in this section displays the count of stores that have varying levels of inventory units. The user can select other metrics to be displayed in the graph from the Show Graph dropdown list in the top-right corner of the SKU-Store Frequency Graphs section. The metrics that the user may select are: current inventory (default), price elasticity, markdowns taken, start inventory, end inventory, inventory at risk, estimated out date, plan maximum percent discount, and markdowns planned.

FIG. 14 depicts at 550 an example graphical interface through which a user could interact with the markdown optimization system to approve tentative price changes to the active clearance plan. To select the prices to be used in an active clearance plan, the user selects either the plan price or the current price by clicking the appropriate check box. If the user does not select a price, he or she is indicating that the current price should be maintained. Note that it is not necessary to select price changes for all plan periods at one time. It is often better to view ongoing results for a clearance plan before deciding whether to implement further price changes. The user can optimize the current plan on the Alternative Plan tab at any point to update the list of suggested prices for a clearance plan.

Figure 15:
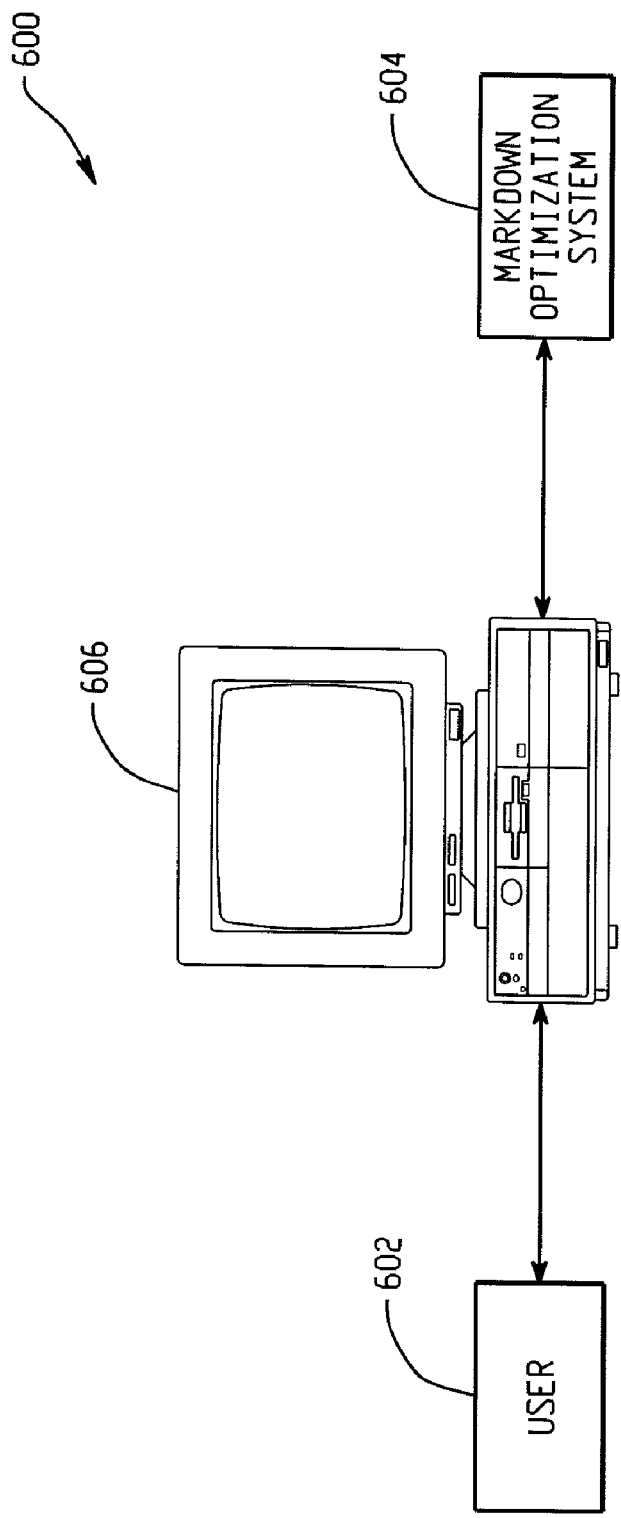
FIG. 15 is a system diagram showing an example of a user interacting with a stand-alone computer implementation of a markdown optimization system.

FIG. 15 depicts at 600 a system for a user 602 to interact with the markdown optimization system 604. The system thus depicted may be implemented on a stand-alone personal computer (PC) 606, but it is not restricted to such an implementation. The system may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, a markdown optimization system can be configured as disclosed herein to provide for a solution for the markdown pricing problem which is significantly complex because of, among other things, the large number of product/location combinations and nonlinear objective and constraints as well as because product/location groups are not optimized independently.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for identifying an item to be marked down, comprising:
   determining, using one or more processors, an optimal markdown plan for each item in a pool of items, wherein the optimal markdown plan maximizes revenue when an item is marked down during a first budget period;
   determining, using the one or more processors, an optimal delay plan for each item, wherein the optimal delay plan maximizes revenue when an item is marked down during a second budget period that is subsequent to the first budget period;
   calculating, using the one or more processors, a delay cost for each item using a difference between the optimal markdown plan maximized revenue and the delayed markdown plan maximized revenue;
   determining, using the one or more processors, a markdown spend for each item using the optimal markdown plan;
   determining, using the one or more processors, a delay efficiency metric for each item using the delay cost and the markdown spend; and
   identifying, using the one or more processors, an item in the pool of items to be marked down using the delay efficiency metric.

2. The method of claim 1, wherein the pool of items contains products or services.

3. The method of claim 1, wherein the optimal markdown plan maximizes revenue while satisfying one or more business rules.

4. The method of claim 3, wherein the one or more business rules include limits on item discount amounts, limits on frequency of discounts, limits on dates of discounts, or limits on available markdown budget.

5. The method of claim 1, wherein the second budget period is a next budget period after the first budget period.

6. The method of claim 1, wherein an item hierarchy contains the items from the pool of items, and wherein a location hierarchy contains locations associated with the items from the pool of items.

7. The method of claim 1, wherein the delay efficiency metric is a ratio of the delay cost to the markdown spend, and wherein the pool of products are sorted based upon the delay efficiency metric.

8. The method of claim 1, wherein the identified item is marked down for an item clearance period.

9. The method of claim 1, wherein the identified product is included in a price schedule containing weekly item prices.

10. The method of claim 1, wherein i is representative of each item;
    wherein $d_i$ is representative of the delay cost;
    wherein $b_i$ is representative of the markdown spend; and
    wherein ratio $d_i/b_i$ is representative of the delay efficiency metric.

11. The method of claim 1, wherein the markdown spend is indicative of a reduction in value of inventory on hand at a beginning of a markdown period after a markdown.

12. A system for identifying an item to be marked down, comprising:
- one or more processors;
- one or more computer-readable storage media containing instructions configured to cause the one or more processors to perform operations including:
- determining an optimal markdown plan for each item in a pool of items, wherein the optimal markdown plan maximizes revenue when an item is marked down during a first budget period;
- determining an optimal delay plan for each item, wherein the optimal delay plan maximizes revenue when an item is marked down during a second budget period that is subsequent to the first budget period;
- calculating a delay cost for each item using a difference between the optimal markdown plan maximized revenue and the delayed markdown plan maximized revenue;
- determining a markdown spend for each item using the optimal markdown plan;
- determining a delay efficiency metric for each item using the delay cost and the markdown spend; and
- identifying an item in the pool of items to be marked down using the delay efficiency metric.

13. A non-transitory machine-readable medium tangibly embodying a computer program product for identifying an item to be marked down, including instructions configured to cause a data processing system to:
- determine an optimal markdown plan for each item in a pool of items, wherein the optimal markdown plan maximizes revenue when an item is marked down during a first budget period;
- determine an optimal delay plan for each item, wherein the optimal delay plan maximizes revenue when an item is marked down during a second budget period that is subsequent to the first budget period;
- calculate a delay cost for each item using a difference between the optimal markdown plan maximized revenue and the delayed markdown plan maximized revenue;
- determine a markdown spend for each item using the optimal markdown plan;
- determine a delay efficiency metric for each item using the delay cost and the markdown spend; and
- identify an item in the pool of items to be marked down using the delay efficiency metric.

* * * * *

UNITED STATES PATENT AND TRADEMARK OFFICE
CERTIFICATE OF CORRECTION

| | | |
|---|---|---|
| PATENT NO. | : 8,000,996 B1 | Page 1 of 1 |
| APPLICATION NO. | : 11/937103 | |
| DATED | : August 16, 2011 | |
| INVENTOR(S) | : Sanli et al. | |

It is certified that error appears in the above-identified patent and that said Letters Patent is hereby corrected as shown below:

In column 20, line 59, delete "i" and insert -- $i$ --.

Signed and Sealed this
Fifteenth Day of November, 2011

David J. Kappos
*Director of the United States Patent and Trademark Office*